US009610842B2

(12) United States Patent
Kasuya et al.

(10) Patent No.: US 9,610,842 B2
(45) Date of Patent: Apr. 4, 2017

(54) VEHICLE HYDRAULIC PRESSURE SUPPLY DEVICE

(71) Applicant: AISIN AW CO., LTD., Anjo-shi, Aichi-ken (JP)

(72) Inventors: Satoru Kasuya, Nishio (JP); Nobukazu Ike, Kariya (JP); Masashi Kito, Anjo (JP); Yuichi Seki, Okazaki (JP); Taisuke Fukui, Gamagori (JP); Osamu Murai, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/915,795

(22) PCT Filed: Sep. 30, 2014

(86) PCT No.: PCT/JP2014/076135
§ 371 (c)(1),
(2) Date: Mar. 1, 2016

(87) PCT Pub. No.: WO2015/046578
PCT Pub. Date: Apr. 2, 2015

(65) Prior Publication Data
US 2016/0207401 A1 Jul. 21, 2016

(30) Foreign Application Priority Data

Sep. 30, 2013 (JP) ................................. 2013-204931

(51) Int. Cl.
*B60K 17/28* (2006.01)
*B60K 25/00* (2006.01)
(Continued)

(52) U.S. Cl.
CPC ............ *B60K 41/047* (2013.01); *B60K 25/02* (2013.01); *F04C 2/102* (2013.01); *F04C 11/001* (2013.01);
(Continued)

(58) Field of Classification Search
CPC ........ F16H 61/00; B60K 25/02; B60K 41/047; B60K 2025/026; F04C 2/102; F04C 11/001; F04C 15/06; F04C 2210/206
(Continued)

(56) References Cited

U.S. PATENT DOCUMENTS 3,646,836 A * 3/1972 Kubo ...................... F16H 59/26
477/159
3,892,503 A 7/1975 Getman
(Continued)

FOREIGN PATENT DOCUMENTS

JP H04-183933 A 6/1992
JP 2002-340157 A 11/2002
(Continued)

OTHER PUBLICATIONS

Dec. 22, 2014 Search Report issued in International Patent Application No. PCT/JP2014/076135.

*Primary Examiner* — Toan To
(74) *Attorney, Agent, or Firm* — Oliff PLC

(57) ABSTRACT

A vehicle hydraulic pressure supply device that includes a mechanical oil pump driven by a drive force source for wheels; an oil passage constitution member in which an oil passage connected to the mechanical oil pump is formed; and a hydraulic control device that controls a hydraulic pressure supplied from the mechanical oil pump via the oil passage constitution member and that supplies the hydraulic pressure to a vehicle drive transmission device.

16 Claims, 10 Drawing Sheets

(51) Int. Cl.
*B60W 10/04* (2006.01)
*F16H 61/00* (2006.01)
*F04C 2/10* (2006.01)
*F04C 11/00* (2006.01)
*F04C 15/06* (2006.01)
*B60K 25/02* (2006.01)

(52) U.S. Cl.
CPC .............. *F04C 15/06* (2013.01); *F16H 61/00* (2013.01); *B60K 2025/026* (2013.01); *F04C 2210/206* (2013.01)

(58) Field of Classification Search
USPC ...... 180/53.4; 417/217, 218, 279; 418/27, 30
See application file for complete search history.

(56) References Cited

U.S. PATENT DOCUMENTS

| | | | | |
|---|---|---|---|---|
| 4,733,582 A | * | 3/1988 | Eggert | ................ F16H 47/065 474/28 |
| 5,409,421 A | * | 4/1995 | Sakai | .................. F16H 61/067 474/28 |
| 6,682,451 B1 | * | 1/2004 | Luh | ........................ F16H 61/12 474/18 |
| 6,796,773 B1 | * | 9/2004 | Choi | .................... F04C 18/3562 417/218 |
| 6,980,897 B2 | * | 12/2005 | Aoki | ................. F16H 61/66254 474/18 |
| 2002/0170383 A1 | | 11/2002 | Fujikawa et al. | |
| 2010/0242669 A1 | | 9/2010 | Komizo et al. | |
| 2014/0147323 A1 | * | 5/2014 | Watanabe | ............. F04C 2/3442 418/27 |
| 2015/0086405 A1 | * | 3/2015 | Konakawa | ............ F04C 15/064 418/191 |
| 2016/0177950 A1 | * | 6/2016 | Watanabe | ............ F04C 14/226 418/24 |
| 2016/0230756 A1 | * | 8/2016 | Kito | ....................... B60R 17/02 |

FOREIGN PATENT DOCUMENTS

| | | |
|---|---|---|
| JP | 4244345 B2 | 3/2009 |
| JP | 2010-158975 A | 7/2010 |
| JP | 2010-236581 A | 10/2010 |
| JP | 2012-057675 A | 3/2012 |

* cited by examiner

VEHICLE HYDRAULIC PRESSURE SUPPLY DEVICE

BACKGROUND

The present disclosure relates to a vehicle hydraulic pressure supply device that includes a mechanical oil pump driven by a drive force source for wheels, an oil passage constitution member in which an oil passage connected to the mechanical oil pump is formed, and a hydraulic control device that controls a hydraulic pressure supplied from the mechanical oil pump via the oil passage constitution member and that supplies the hydraulic pressure to a vehicle drive transmission device.

A device described in Japanese Patent Application Publication No. 2012-57675 mentioned below is already known as an example of the vehicle hydraulic pressure supply device described above. In the device according to Japanese Patent Application Publication No. 2012-57675, oil discharged from a mechanical oil pump is supplied into a valve body B via an oil passage formed in a partition wall Ma of a case (transmission housing M) that accommodates a vehicle drive transmission device.

SUMMARY

In the device according to Japanese Patent Application Publication No. 2012-57675, however, oil is supplied via the oil passage in the case, and thus oil discharged from the mechanical oil pump is transported to the valve body through an oil passage with many bends and a long length, which may increase the pressure loss.

Thus, it is desirable to provide a vehicle hydraulic pressure supply device in which oil discharged from a mechanical oil pump can be transported to a valve body through an oil passage with fewer bends and a short length, which can reduce the pressure loss.

The present disclosure according to an exemplary aspect provides a vehicle hydraulic pressure supply device that includes a mechanical oil pump driven by a drive force source for wheels, an oil passage constitution member in which an oil passage connected to the mechanical oil pump is formed, and a hydraulic control device that controls a hydraulic pressure supplied from the mechanical oil pump via the oil passage constitution member and that supplies the hydraulic pressure to a vehicle drive transmission device, wherein a rotary shaft of the mechanical oil pump is disposed on a shaft that is different from an input shaft which is a shaft that serves as a portion of the vehicle drive transmission device to be coupled to the drive force source; the oil passage constitution member includes an accommodation chamber surface that constitutes a rotor accommodation chamber that accommodates a first pump rotor which is a pump rotor of the mechanical oil pump, a first discharge oil passage through which oil discharged by the first pump rotor flows, and a first member joint portion in which an opening of the first discharge oil passage is formed; the hydraulic control device includes a valve body in which an oil passage configured to adjust a hydraulic pressure to be supplied to respective supply target portions of the vehicle drive transmission device and an accommodation chamber that accommodates a hydraulic control valve that controls the hydraulic pressure are formed; the valve body includes a first body oil passage, and a first body joint portion in which an opening of the first body oil passage is formed; and the first discharge oil passage and the first body oil passage are connected to each other with the first member joint portion and the first body joint portion joined to each other as located opposite to each other.

According to the characteristic configuration, the rotary shaft of the mechanical oil pump is disposed on a shaft that is different from the input shaft of the vehicle drive transmission device. Thus, it is possible to enhance the degree of freedom in arrangement of the oil passage constitution member with respect to the rotary shaft of the mechanical oil pump, and to dispose the oil passage constitution member near the valve body. The first member joint portion of the oil passage constitution member and the first body joint portion of the valve body are joined to each other as located opposite to each other. Thus, it is possible to shorten the oil passage by reducing the number of bends of the oil passage at the joint location. In addition, the oil passage constitution member includes the accommodation chamber surface which constitutes the rotor accommodation chamber of the mechanical oil pump, and also serves as a housing for the mechanical oil pump. Hence, the oil passage constitution member can receive oil discharged from the first pump rotor of the mechanical oil pump over the shortest distance, and transport the oil to the valve body.

Thus, it is possible to transport oil discharged from the mechanical oil pump to the valve body through an oil passage with fewer bends and a short length, which can reduce the pressure loss. Hence, it is possible to reduce the drive load on the mechanical oil pump, and to improve the fuel efficiency of the vehicle.

The oil passage constitution member further includes a first surface contacted by an axial end surface of the first pump rotor, the first surface being provided with a first discharge port which is dented inwardly of the oil passage constitution member and through which oil is discharged from the mechanical oil pump; and the first discharge oil passage extends radially outward with reference to a rotational axis of the mechanical oil pump from the first discharge port to the opening in the first member joint portion.

According to the configuration, the first discharge port is formed in the first surface which is contacted by an axial end surface of the first pump rotor. Thus, oil can be supplied from the first pump rotor to the oil passage constitution member over the shortest distance. The first discharge oil passage extends radially outward with reference to the rotational axis of the mechanical oil pump from the first discharge port to the opening in the first member joint portion. Thus, it is possible to reduce the number of bends of the oil passage through the first discharge oil passage, and to shorten the length of the oil passage to a minimum, which can reduce the pressure loss.

Preferably, the first member joint portion and the first body joint portion are connected to each other as located opposite to each other directly or via a tubular member that is tubular and that extends linearly.

In the case where the first member joint portion and the first body joint portion are connected to each other directly as located opposite to each other, the joint location between the first member joint portion and the first body joint portion can be made shortest. In the case where the first member joint portion and the first body joint portion are connected to each other as located opposite to each other via a tubular member that is tubular and that extends linearly, on the other hand, although the oil passage at the joint location is extended by an amount corresponding to the tubular member, the first member joint portion and the first body joint portion can be joined to each other linearly. Thus, it is possible to reduce the number of bends of the oil passage at the joint location.

Preferably, the vehicle hydraulic pressure supply device further includes an auxiliary hydraulic pressure source; the oil passage constitution member further includes a second discharge oil passage through which oil discharged from the auxiliary hydraulic pressure source flows, and a second member joint portion in which an opening of the second discharge oil passage is formed; the valve body further includes a second body oil passage, and a second body joint portion in which an opening of the second body oil passage is formed; and the second discharge oil passage and the second body oil passage are connected to each other with the second member joint portion and the second body joint portion joined to each other as located opposite to each other.

According to the configuration, oil discharged from the auxiliary hydraulic pressure source can be transported to the second body oil passage provided in the valve body via the second discharge oil passage provided in the oil passage constitution member. The second member joint portion of the oil passage constitution member and the second body joint portion of the valve body are joined to each other as located opposite to each other. Thus, it is possible to shorten the oil passage by reducing the number of bends of the oil passage at the joint location.

Preferably, the auxiliary hydraulic pressure source is an electric oil pump driven by an electric motor, an electromagnetic pump driven by an electromagnetic actuator, or an accumulator.

According to the configuration, it is possible to shorten the oil passage by reducing the number of bends of the oil passage through which oil discharged from the electric oil pump, the electromagnetic pump, or the accumulator flows.

Preferably, the auxiliary hydraulic pressure source is an electric oil pump driven by an electric motor, and oil discharged by a second pump rotor which is a pump rotor of the electric oil pump flows through the second discharge oil passage; and the oil passage constitution member further includes a first surface contacted by an axial end surface of the first pump rotor, and a second surface which faces a direction opposite to the first surface and which is contacted by an axial end surface of the second pump rotor.

According to the configuration, an axial end surface of the first pump rotor of the mechanical oil pump is disposed in contact with the first surface of the oil passage constitution member, and an axial end surface of the second pump rotor of the electric oil pump is disposed in contact with the second surface which faces the direction opposite to the first surface. Hence, the oil passage constitution member can also receive oil discharged from the second pump rotor of the electric oil pump over the shortest distance, and transport the oil to the valve body. In addition, the mechanical oil pump and the electric oil pump can be efficiently disposed on the first surface and the second surface, respectively, of the oil passage constitution member so that an oil passage connected to the mechanical oil pump and an oil passage connected to the electric oil pump can be formed efficiently. Therefore, the vehicle hydraulic pressure supply device can be reduced in size.

Preferably, the second surface is provided with a second discharge port which is dented inwardly of the oil passage constitution member and through which oil is discharged from the electric oil pump; and the second discharge oil passage extends radially outward with reference to a rotational axis of the electric oil pump from the second discharge port to an opening in the second member joint portion.

According to the configuration, the second discharge port is formed in the second surface which is contacted by an axial end surface of the second pump rotor. Thus, oil can be supplied from the second pump rotor to the oil passage constitution member over the shortest distance. The second discharge oil passage extends radially outward with reference to the rotational axis of the electric oil pump from the second discharge port to the opening in the second member joint portion. Thus, it is possible to reduce the number of bends of the oil passage through the second discharge oil passage, and to shorten the length of the oil passage to a minimum, which can reduce the pressure loss.

Preferably, the oil passage constitution member further includes a suction oil passage through which oil suctioned by the first pump rotor flows, a return hole configured to return oil discharged by the first pump rotor to the suction oil passage, and a third member joint portion in which an opening of the return hole is formed; the valve body includes a third body oil passage, and a third body joint portion in which an opening of the third body oil passage is formed; and the third body oil passage is connected to the return hole with the third member joint portion and the third body joint portion joined to each other as located opposite to each other.

In the case where oil discharged from the mechanical oil pump is more than the required amount, excess oil is returned to the suction side such as an oil reservoir. According to the configuration described above, the oil passage constitution member which is provided with the suction oil passage is provided with the return hole which is configured to return oil discharged by the first pump rotor to the suction oil passage. Thus, oil discharged from the mechanical oil pump can be returned to the suction side over a short distance compared to a case where oil is returned from an oil reservoir to the suction oil passage after excess oil is drained from the valve body to the oil reservoir, which can reduce the pressure loss.

In addition, the third member joint portion in which the opening of the return hole is formed and the third body joint portion of the valve body are joined to each other as located opposite to each other. Thus, it is possible to shorten the oil passage by reducing the number of bends of the oil passage at the joint location.

Preferably, the oil passage constitution member further includes a suction oil passage through which oil suctioned by the first pump rotor flows, a return hole configured to return oil discharged by the first pump rotor to the suction oil passage, and a third member joint portion in which an opening of the return hole is formed; the valve body includes a third body oil passage, and a third body joint portion in which an opening of the third body oil passage is formed; the third body oil passage is connected to the return hole with the third member joint portion and the third body joint portion joined to each other as located opposite to each other; the first member joint portion, the second member joint portion, and the third member joint portion are formed in the same surface or surfaces that are parallel to each other, and formed in a surface that is parallel to an extension direction of a rotational axis of the first pump rotor; and the second member joint portion, the first member joint portion, and the third member joint portion are disposed in this order from one side in a circumferential direction with reference to the rotational axis of the first pump rotor.

According to the configuration, the first member joint portion, the second member joint portion, and the third member joint portion are formed in the same surface or surfaces that are parallel to each other. Thus, it is possible to simplify the structure of joint with the first body joint portion, the second body joint portion, and the third body joint portion of the valve body, and to also simplify the seal structure at the joint portions. In addition, machining of the oil passage constitution member and the valve body can be facilitated. The first member joint portion, the second member joint portion, and the third member joint portion are formed in a surface that is parallel to the extension direction of the rotational axis of the first pump rotor. Thus, it is easy to extend the first discharge oil passage, the second discharge oil passage, and the return hole radially outward to open in the respective member joint portions. Hence, it is possible to shorten the oil passage by reducing the number of bends of the oil passage through the first discharge oil passage, the second discharge oil passage, and the return hole.

In addition, the first member joint portion is disposed between the second member joint portion and the third member joint portion in the circumferential direction. Thus, the first discharge oil passage can be extended radially outward. Hence, it is possible to reduce the number of bends of the oil passage through the first discharge oil passage, and to dispose the first discharge oil passage over the shortest distance, which can reduce the pressure loss. In the case where the discharge capacity of the mechanical oil pump is larger than the discharge capacity of the electric oil pump, the effect in reducing the pressure loss can be increased.

In addition, the second member joint portion, the first member joint portion, and the third member joint portion are disposed side by side in the circumferential direction. Thus, it is possible to suppress an increase in width (axial length) of the oil passage constitution member, and to shorten the length of the entire device in the axial direction.

Preferably, the return hole includes a discharge return oil passage that communicates with the first discharge oil passage and that returns oil in the first discharge oil passage to the suction oil passage; the return hole accommodates a return oil passage control valve that controls a degree of opening of the discharge return oil passage; the opening of the return hole is an opening through which a command hydraulic pressure for operation of the return oil passage control valve is supplied to the return oil passage control valve; and the third body oil passage is an oil passage through which the command hydraulic pressure is supplied.

According to the configuration, the return hole includes the discharge return oil passage through which oil in the first discharge oil passage is returned to the suction oil passage. Thus, it is possible to return oil discharged from the mechanical oil pump to the suction side over the shortest distance, which can reduce the pressure loss.

Preferably, the return hole is a body return oil passage through which oil in the third body oil passage is returned to the suction oil passage; the opening of the return hole is an opening through which oil to be returned to the suction oil passage is supplied; and the third body oil passage is an oil passage through which oil discharged from the hydraulic control valve flows.

According to the configuration, oil can be returned from the third body oil passage in the valve body to the suction oil passage via the return hole which is used as the body return oil passage. Hence, oil drained from the valve body can be returned to the suction side over a short distance compared to a case where oil is returned from an oil reservoir to the suction oil passage after excess oil is drained from the valve body to the oil reservoir, which can reduce the pressure loss.

DETAILED DESCRIPTION OF EMBODIMENTS

A vehicle hydraulic pressure supply device 1 according to an embodiment of the present disclosure will be described with reference to the drawings.

Figure 1:
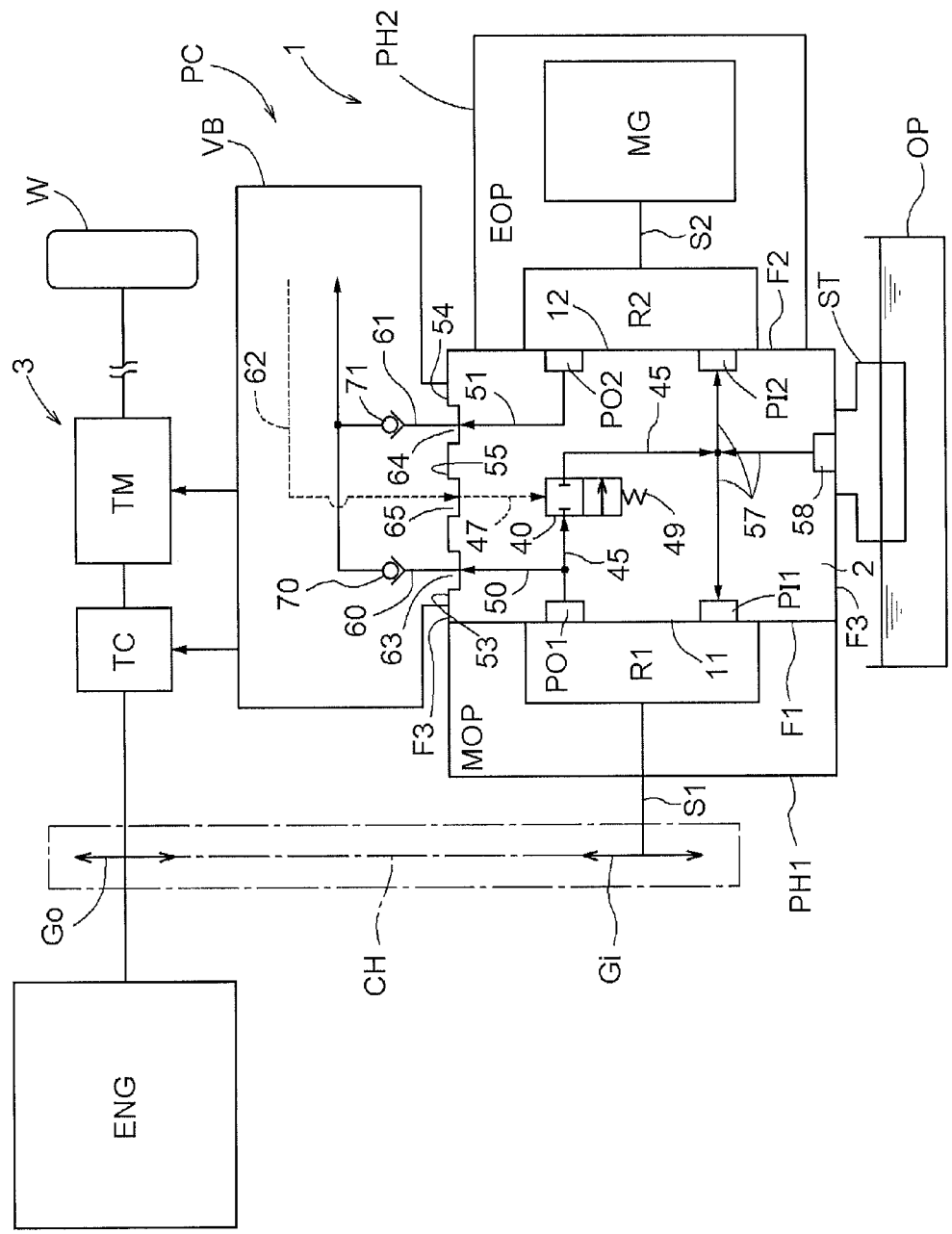
FIG. 1 is a schematic diagram illustrating a schematic configuration of a vehicle hydraulic pressure supply device according to an embodiment of the present disclosure.
Figure 2:
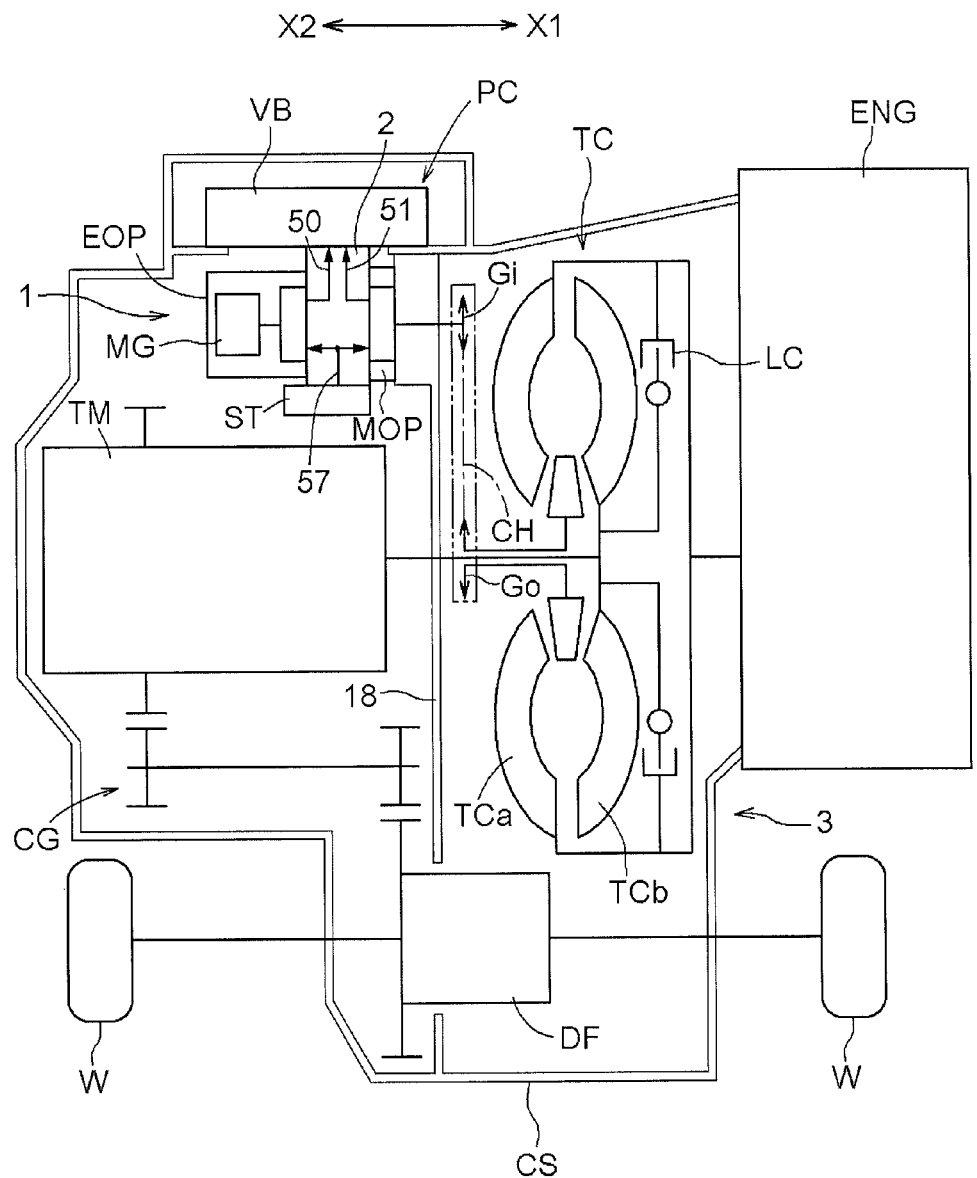
FIG. 2 is a schematic diagram illustrating a schematic configuration of a vehicle hydraulic pressure supply device and a vehicle drive transmission device according to the embodiment of the present disclosure.

As illustrated in FIGS. 1 and 2, the vehicle hydraulic pressure supply device 1 includes: a mechanical oil pump MOP driven by a drive force source for wheels W; an oil passage constitution member 2 in which an oil passage connected to the mechanical oil pump MOP is formed; and a hydraulic control device PC that controls a hydraulic pressure supplied from the mechanical oil pump MOP via the oil passage constitution member 2 and that supplies the hydraulic pressure to a vehicle drive transmission device 3.

In the embodiment, the vehicle hydraulic pressure supply device 1 is accommodated in a case CS that accommodates the vehicle drive transmission device 3. The vehicle hydraulic pressure supply device 1 further includes an electric oil pump EOP driven by an electric motor MG. In addition, an oil passage connected to the electric oil pump EOP is further formed in the oil passage constitution member 2. The hydraulic control device PC is supplied with a hydraulic pressure also from the electric oil pump EOP via the oil passage constitution member 2.

The oil passage constitution member 2 includes: an accommodation chamber surface 11 that constitutes a first rotor accommodation chamber 17 that accommodates a first pump rotor R1 which is a pump rotor of the mechanical oil pump MOP; a first discharge oil passage 50 through which oil discharged by the first pump rotor R1 flows; and a first member joint portion 53 in which an opening of the first discharge oil passage 50 is formed.

The hydraulic control device PC includes a valve body VB in which an oil passage configured to adjust a hydraulic pressure to be supplied to respective supply target portions of the vehicle drive transmission device 3 and an accommodation chamber that accommodates a hydraulic control valve that controls the hydraulic pressure are formed. The valve body VB includes a first body oil passage 60, and a first body joint portion 63 in which an opening of the first body oil passage 60 is formed.

The first discharge oil passage 50 and the first body oil passage 60 are connected to each other with the first member joint portion 53 and the first body joint portion 63 joined to each other as located opposite to each other.

The configuration of each component will be described in detail below.

1. Configuration of Vehicle Drive Transmission Device 3 and Internal Combustion Engine ENG The vehicle drive transmission device 3 is drivably coupled to an internal combustion engine ENG which serves as a drive force source for driving the vehicle, and configured to transmit a rotational drive force of the internal combustion engine ENG to the wheels W with the speed of the rotational drive force changed by a speed change device TM via a torque converter TC.

The internal combustion engine ENG is a heat engine driven by combustion of fuel. Various internal combustion engines known in the art such as gasoline engines and diesel engines, for example, may be used as the internal combustion engine ENG.

The torque converter TC transmits a drive force between a pump impeller TCa on the input side (driving side) and a turbine runner TCb on the output side (driven side) via oil filling the torque converter TC. The torque converter TC includes a lock-up clutch LC that couples the pump impeller TCa and the turbine runner TCb so as to rotate together with each other. The torque converter TC including the lock-up clutch LC is supplied with oil at a pressure regulated by the hydraulic control device PC.

The speed change device TM is configured to transmit rotation of an input shaft, which is a shaft to be coupled to the internal combustion engine ENG, to an output shaft with the speed of the rotation changed with a predetermined speed ratio. In the embodiment, the speed change device TM is a stepped automatic transmission that provides a plurality of shift speeds with different speed ratios. In order to establish the plurality of shift speeds, the speed change device TM includes a plurality of engagement devices such as clutches and brakes and a gear mechanism such as a planetary gear mechanism.

The speed change device TM establishes each of the shift speeds with the rotational state of the gear mechanism switched in accordance with engagement and disengagement of the plurality of engagement devices. The drive force transmitted to the output shaft is distributed and transmitted to two, left and right, axles via a counter gear mechanism CG and a differential gear device DF to be transmitted to the wheels W which are drivably coupled to the respective axles.

<CASE CS>

The torque converter TC, the speed change device TM, the counter gear mechanism CG, the differential gear device DF, and so forth which constitute the vehicle drive transmission device 3 are accommodated in the case CS. The case CS includes an outer wall formed so as to cover the outer side of the vehicle drive transmission device 3. In addition, the case CS includes a partition wall that partially or entirely covers the torque converter TC, the speed change device TM, the counter gear mechanism CG, the differential gear device DF, and a power transmission member that couples such components so as to transmit power, in order to support or separate the components.

2. Schematic Configuration of Vehicle Hydraulic Pressure Supply Device 1

Next, the vehicle hydraulic pressure supply device 1 will be described. The vehicle hydraulic pressure supply device 1 includes a hydraulic pressure source, and the hydraulic control device PC which controls a hydraulic pressure supplied from the hydraulic pressure source and which supplies the hydraulic pressure to the vehicle drive transmission device 3.

The vehicle hydraulic pressure supply device 1 includes, as the hydraulic pressure source, the mechanical oil pump MOP which is driven by the drive force source for the wheels W, and an auxiliary hydraulic pressure source. In the embodiment, the auxiliary hydraulic pressure source is the electric oil pump EOP which is driven by the electric motor MG.

The hydraulic control device PC includes a hydraulic circuit composed of an oil passage and a plurality of hydraulic control valves and configured to adjust a hydraulic pressure to be supplied to respective supply target portions of the vehicle drive transmission device 3. The hydraulic control valves include a solenoid valve that generates a signal pressure, a switching valve that switches between oil passages, a pressure regulation valve that regulates a hydraulic pressure, and so forth. Oil adjusted by the hydraulic control device PC to a hydraulic pressure at a level required for each component is supplied to the respective supply target portions of the vehicle drive transmission device 3 such as the plurality of engagement devices of the speed change device TM, the torque converter TC, and the lock-up clutch LC, and used to engage and disengage the engagement devices, used as oil for power transmission by the torque converter TC, used to lubricate gears and bearings, and used to cool friction plates of the engagement devices etc.

3. Valve Body VB

The hydraulic control device PC includes the valve body VB in which an oil passage configured to adjust a hydraulic pressure to be supplied to respective supply target portions of the vehicle drive transmission device 3 and an accommodation chamber that accommodates a hydraulic control valve that controls the hydraulic pressure are formed. The valve body VB is a thick plate-like member by appearance, in which a plurality of plate-like members are stacked via a separate plate etc. A large number of oil passages formed throughout the inside of the valve body VB, a circular columnar accommodation chamber that accommodates a spool and a spring that compose a hydraulic control valve, and so forth are formed in the valve body VB. The valve body VB includes a fixation portion fixed to the case CS, and is fixed to the case CS by a fastening bolt or the like.

Figure 6:
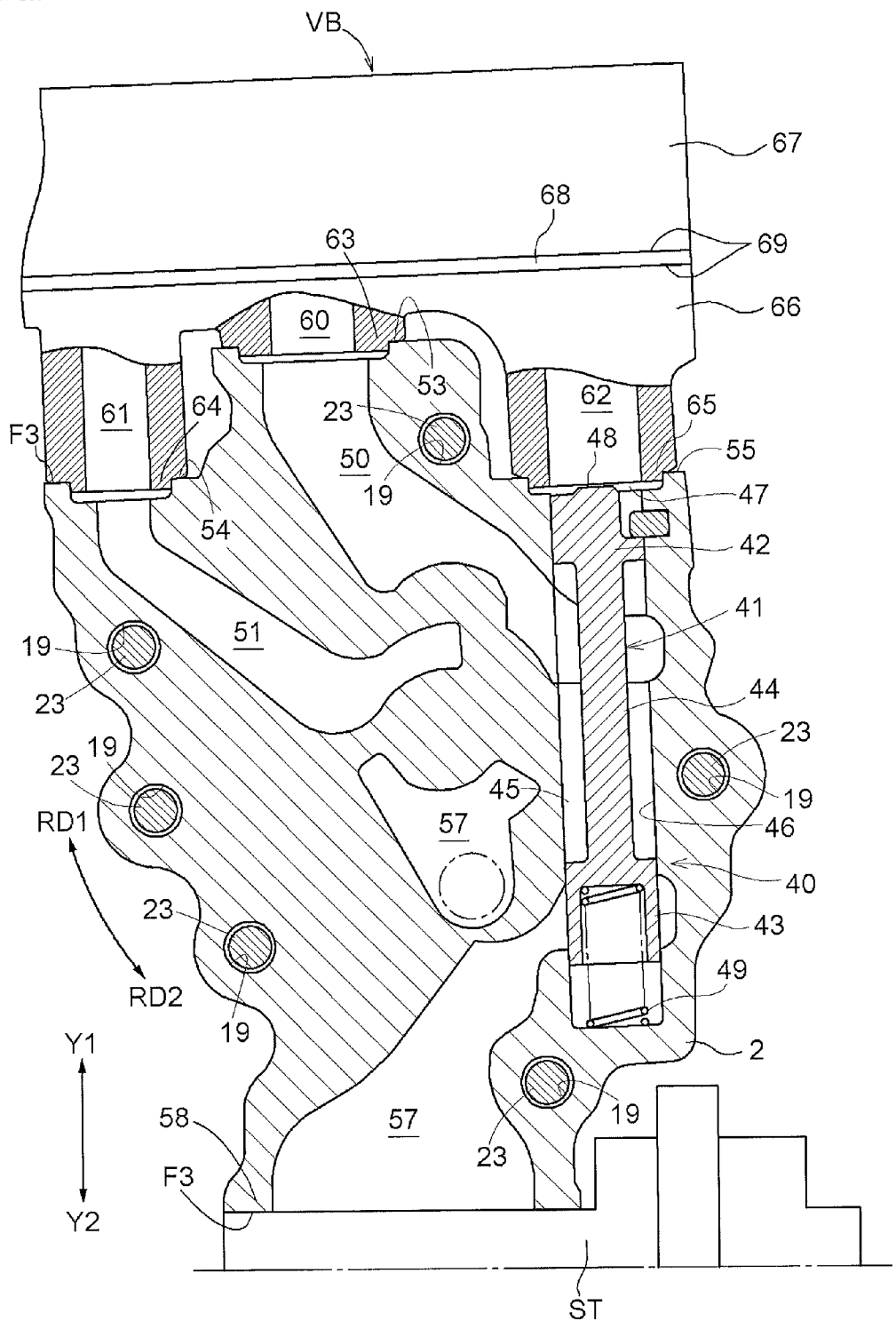
FIG. 6 illustrates a radial sectional view of the oil passage constitution member according to the embodiment of the present disclosure as seen in the axial direction from the first surface side.

As illustrated in FIGS. 1, 6, etc., the valve body VB includes the first body oil passage 60, and the first body joint portion 63 in which an opening of the first body oil passage 60 is formed. The first body joint portion 63 is joined to the first member joint portion 53 of the oil passage constitution member 2 so that the first body oil passage 60 is connected to the first discharge oil passage 50 in the oil passage constitution member 2.

In addition, the valve body VB further includes a second body oil passage 61, and a second body joint portion 64 in which an opening of the second body oil passage 61 is formed. The second body joint portion 64 is joined to a second member joint portion 54 of the oil passage constitution member 2 so that the second body oil passage 61 is connected to a second discharge oil passage 51 in the oil passage constitution member 2.

The valve body VB includes a third body oil passage 62 through which a command hydraulic pressure is supplied to a return oil passage control valve 40, and a third body joint portion 65 in which an opening of the third body oil passage 62 is formed. The third body joint portion 65 is joined to a third member joint portion 55 of the oil passage constitution member 2 so that the third body oil passage 62 is connected to a command pressure oil passage 47 in the oil passage constitution member 2.

In the embodiment, the valve body VB is constructed by superposing a first member 66 and a second member 67 on each other via a separate plate 68. The first member 66 and the second member 67 are each formed in a plate shape. Superposed surfaces 69 of the first member 66 and the second member 67 are flat surfaces.

The first body joint portion 63, the second body joint portion 64, and the third body joint portion 65 which are joined to the oil passage constitution member 2 are formed at an end portion of the valve body VB (first plate-like member 66) on the oil passage constitution member 2 side. Formation surfaces in which the body joint portions 63, 64, and 65 are formed are each a flat surface that is parallel to the superposed surfaces 69 of the valve body VB.

The body joint portions 63, 64, and 65 are each provided at a projection portion that projects toward the oil passage constitution member 2 in a direction that is perpendicular to the superposed surfaces 69. An opening formed in each of the body joint portions 63, 64, and 65 opens toward the oil passage constitution member 2.

The first body oil passage 60, the second body oil passage 61, and the third body oil passage 62 extend toward the valve body VB along a direction that is orthogonal to the superposed surfaces 69 from the corresponding one of the body joint portions 63, 64, and 65.

The first body oil passage 60 and the second body oil passage 61 are merged in the valve body VB, and connected to a hydraulic control valve such as a regulator valve. Oil supplied to the hydraulic control valve is adjusted to a predetermined hydraulic pressure such as a line pressure.

The third body oil passage 62 is supplied with a hydraulic pressure adjusted by a hydraulic control valve such as a solenoid valve, oil drained from a hydraulic control valve such as a regulator valve, and so forth as a command hydraulic pressure.

4. Oil Pump
<Rotational Axis>

Figure 3:
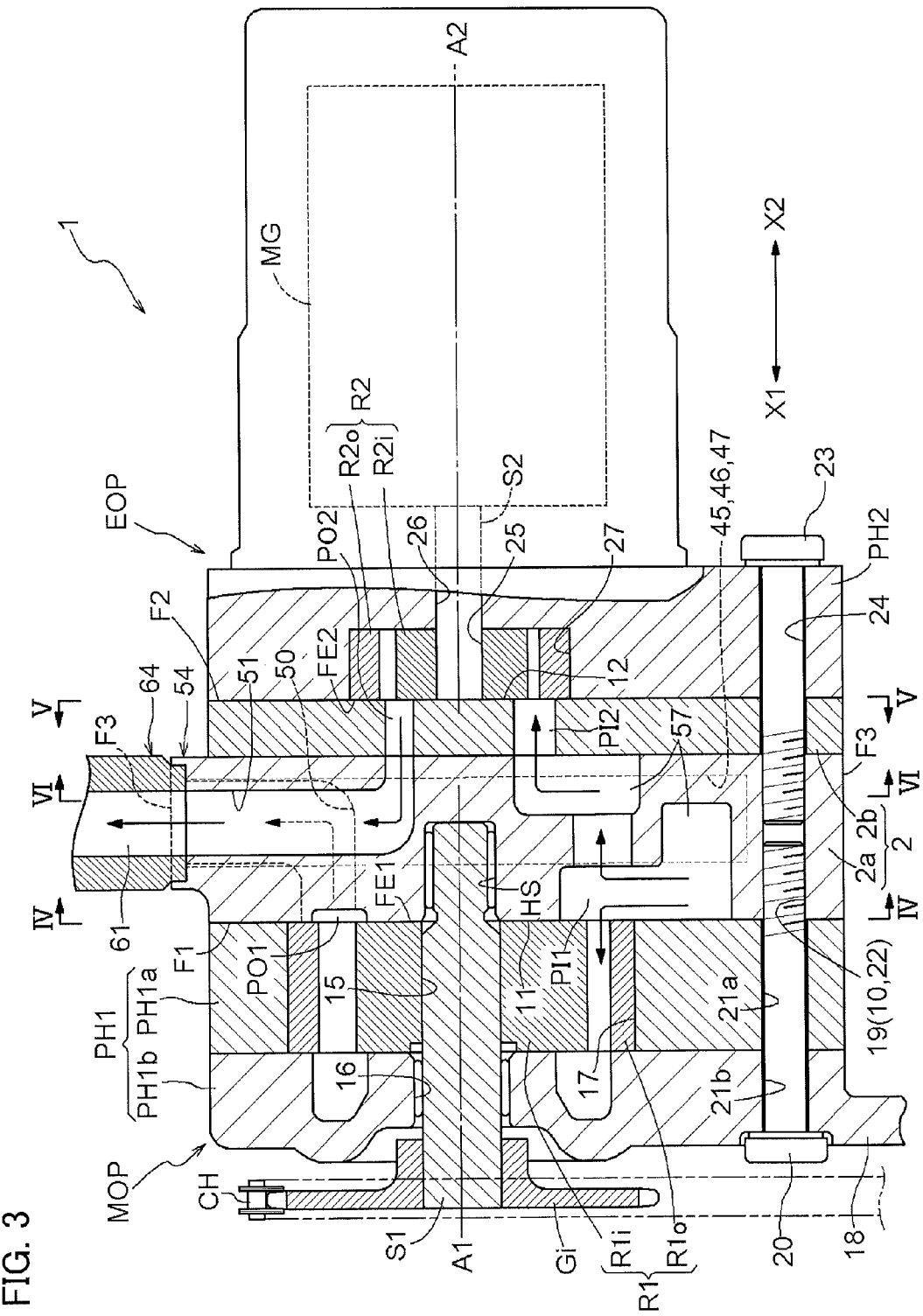
FIG. 3 illustrates an axial sectional view of an oil passage constitution member, a mechanical oil pump, and an electric oil pump according to the embodiment of the present disclosure.

In the embodiment, as illustrated in FIG. 3, a rotational axis A1 (hereinafter referred to as a first rotational axis A1) of the mechanical oil pump MOP and a rotational axis A2 (hereinafter referred to as a second rotational axis A2) of the electric oil pump EOP are disposed in parallel with each other. Hence, the axial direction is common to the two rotational axes A1 and A2. An axial direction from the electric oil pump EOP toward the mechanical oil pump MOP (toward the left side in FIG. 3) is defined as a first axial direction X1. The opposite direction from the mechanical oil pump MOP toward the electric oil pump EOP (toward the right side in FIG. 3) is defined as a second axial direction X2. In the embodiment, the term "parallel" also refers to a substantially parallel state with some tilt due to a manufacturing error or the like.

The first rotational axis A1 and the second rotational axis A2 are disposed in proximity to each other. Specifically, the first rotational axis A1 is disposed so as to overlap a second rotary shaft S2 of the electric oil pump EOP as seen in the axial direction. In addition, the second rotational axis A2 is disposed so as to overlap a first rotary shaft S1 of the mechanical oil pump MOP as seen in the axial direction.

In the embodiment, the first rotational axis A1 and the second rotational axis A2 are disposed coaxially with each other. In addition, the first rotational axis A1 and the second rotational axis A2 are disposed on an axis that is different from the rotational axis of the drive force source for the wheels W. In addition, the first rotational axis A1 and the second rotational axis A2 are parallel to a formation surface in which the first member joint portion 53 is formed.

<Mechanical Oil Pump MOP>

The mechanical oil pump MOP is an oil pump that suctions oil from a first suction port PI1 and discharges the oil to a first discharge port PO1 with the first pump rotor R1 rotated by a drive force of the drive force source for the wheels W. Such a mechanical oil pump MOP can be implemented using a gear pump, a vane pump, or the like.

In the embodiment, the mechanical oil pump MOP is a gear pump, and includes, as the first pump rotor R1, a first outer rotor R1o that has teeth on the inner side and a first inner rotor R1i that is housed inside the first outer rotor R1o and that has teeth on the outer side. The first outer rotor R1o and the first inner rotor R1i are meshed with each other with their centers eccentric with respect to each other. In the embodiment, a trochoid pump provided with no crescent is used.

As illustrated in FIG. 3, the first pump rotor R1 is accommodated in the first rotor accommodation chamber 17 which is circular columnar and formed in a first pump housing PH1. In the embodiment, the outer peripheral surface of the first outer rotor R1o contacts the inner peripheral surface of the first rotor accommodation chamber 17 so as to be rotatably supported. The length of the first rotor accommodation chamber 17 in the axial direction matches the length of the first pump rotor R1 in the axial direction.

As illustrated in FIG. 3, a through hole 15 that extends in the axial direction is formed at the center portion of the first inner rotor R1i, and the first rotary shaft S1 penetrates the through hole 15 to be coupled so as to rotate together with the first inner rotor R1i. The first rotational axis A1 coincides with the rotational axis of the first rotary shaft S1.

An end portion of the first rotary shaft S1 that projects in the second axial direction X2 with respect to the first pump rotor R1 is inserted into a shaft support hole HS formed in a first surface F1 of the oil passage constitution member 2 so as to be rotatably supported. A through hole 16 that extends in the axial direction is formed in the first pump housing PH1 which covers the first axial direction X1 side of the first pump rotor R1, and the first rotary shaft S1 penetrates the through hole 16 so as to be rotatably supported.

The first pump housing PH1 is composed of a rotor accommodation housing member PH1a that forms the outer peripheral surface of the first rotor accommodation chamber 17, and a cover housing member PH1b that contacts and covers respective end surfaces of the first pump rotor R1 and the rotor accommodation housing member PH1a on the first axial direction X1 side. The rotor accommodation housing member PH1a is a member that has the same length as the length of the first pump rotor R1 in the axial direction.

The first rotary shaft S1 penetrates the through hole 16 to projects in the first axial direction X1. An input gear Gi is coupled to an end portion of the first rotary shaft S1 on the first axial direction X1 side so as to rotate together with the first rotary shaft S1. In the embodiment, the input gear Gi is coupled to a drive gear Go provided in a power transmission path that connects between the internal combustion engine ENG and the wheels W via a chain CH. In the example, as illustrated in FIG. 2, the drive gear Go is drivably coupled so as to rotate together with the pump impeller TCa of the torque converter TC, and configured to rotate together with the internal combustion engine ENG.

The case CS includes an intermediate wall 18 that supports a drive force transmission shaft etc. The drive force transmission shaft transmits a drive force of a drive force source from the torque converter TC to the speed change device TM.

In the embodiment, as illustrated in FIGS. 2 and 3, the cover housing member PH1*b* is formed integrally with the intermediate wall 18. That is, a part (the cover housing member PH1*b*) of the first pump housing PH1 is formed integrally with the case CS.

<Electric Oil Pump EOP>

The electric oil pump EOP is an oil pump that suctions oil from a second suction port PI2 and discharges the oil to a second discharge port PO2 with a second pump rotor R2 rotated by a drive force of the electric motor MG. Such an electric oil pump EOP can be implemented using a gear pump, a vane pump, or the like.

In the embodiment, the electric oil pump EOP is a gear pump, and includes, as the second pump rotor R2, a second outer rotor R2*o* that has teeth on the inner side and a second inner rotor R2*i* that is housed inside the second outer rotor R2*o* and that has teeth on the outer side. The second outer rotor R2*o* and the second inner rotor R2*i* are meshed with each other with their centers eccentric with respect to each other. In the embodiment, a trochoid pump provided with no crescent is used.

As illustrated in FIG. 3, the second pump rotor R2 is accommodated in the second rotor accommodation chamber 27 which is circular columnar and formed in a second pump housing PH2. In the embodiment, the outer peripheral surface of the second outer rotor R2*o* contacts the inner peripheral surface of the second rotor accommodation chamber 27 so as to be rotatably supported. The length of the second rotor accommodation chamber 27 in the axial direction matches the length of the second pump rotor R2 in the axial direction.

As illustrated in FIG. 3, a through hole 25 that extends in the axial direction is formed at the center portion of the second inner rotor R2*i*, and the second rotary shaft S2 penetrates the through hole 25 to be coupled so as to rotate together with the second inner rotor R2*i*. The second rotational axis A2 coincides with the rotational axis of the second rotary shaft S2.

A through hole 26 that extends in the axial direction is formed in the second pump housing PH2 which covers the second axial direction X2 side of the second pump rotor R2, and the second rotary shaft S2 penetrates the through hole 26 so as to be rotatably supported.

A motor rotor of the electric motor MG is coupled to an end portion of the second rotary shaft S2 on the second axial direction X2 side so as to rotate together with the second rotary shaft S2. The electric motor MG has a function as a motor (electric motor) that generates power upon receiving supply of electric power from a battery or the like.

5. Oil Passage Constitution Member 2

An oil passage connected to the mechanical oil pump MOP and an oil passage connected to the electric oil pump EOP are formed in the oil passage constitution member 2.

In the embodiment, the oil passage constitution member 2 is composed of two members, namely a member 2*a* on the first axial direction X1 side and a member 2*b* on the second axial direction X2 side.

5-1. Fixation Portion

The oil passage constitution member 2 includes a case fixation portion 10 fixed to the case CS. The oil passage constitution member 2 is not a part of the case CS but a member fixed to the case CS, and does not directly or indirectly support a drive force transmission mechanism that transmits a drive force of a drive force source to the wheels W as the case CS. Thus, the oil passage constitution member 2 is different from the case CS in which an oil passage is formed.

Figure 4:
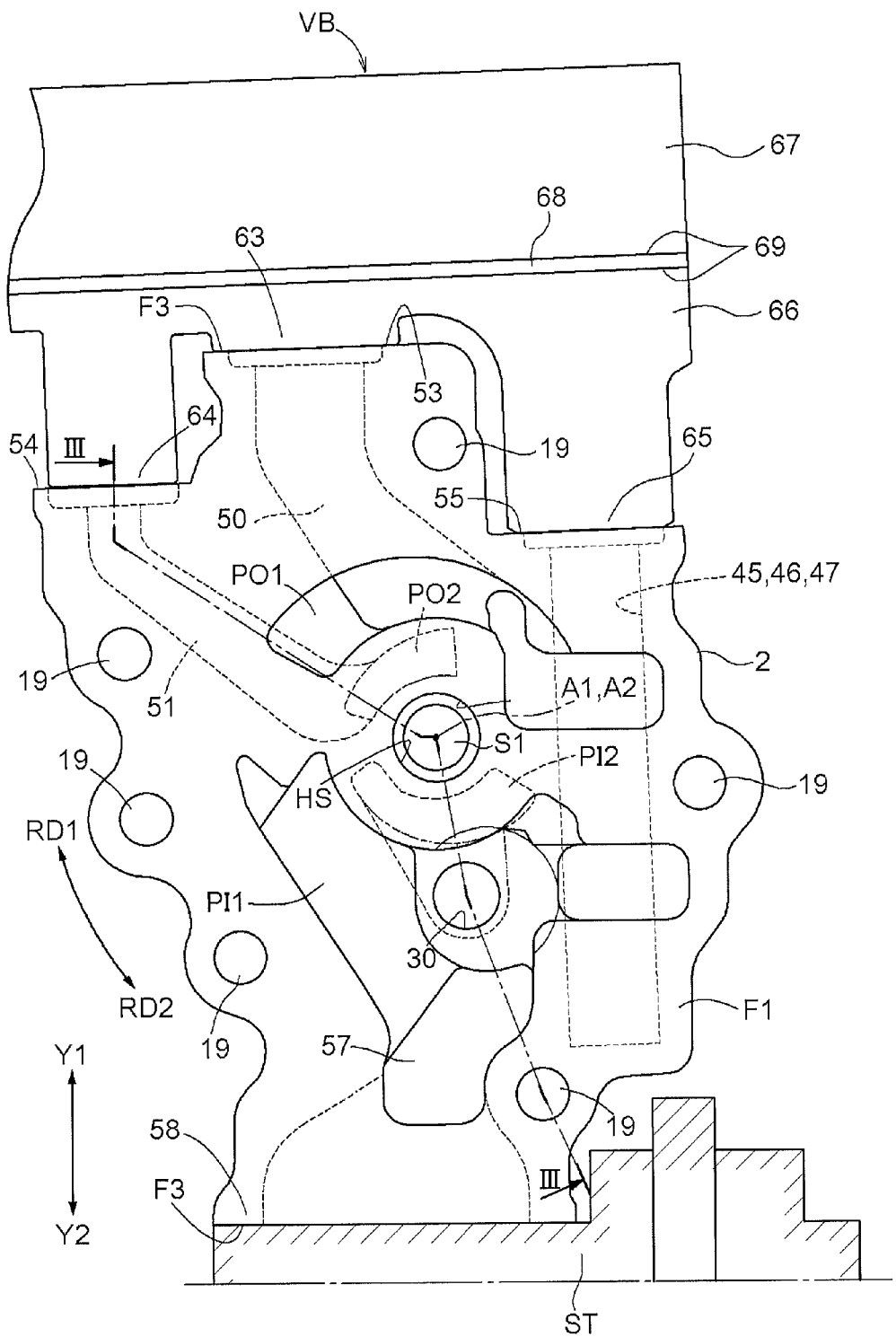
FIG. 4 is a view of the oil passage constitution member according to the embodiment of the present disclosure as seen in the axial direction from the first surface side.

In the embodiment, as illustrated in FIGS. 3 and 4, the oil passage constitution member 2 is provided with a plurality of bolt insertion holes 19, which extend in the axial direction and in which female threads are formed, as the case fixation portion 10, and fastening bolts 20 are screwed into the bolt insertion holes 19. In addition, bolt through holes 21*b* and 21*a*, which extend in the axial direction and into which the fastening bolts 20 are inserted, are formed in the cover housing member PH1*b* and the rotor accommodation housing member PH1*a*, respectively, which compose the first pump housing PH1. A plurality of bolt through holes 21*b* and 21*a* are provided in correspondence with the bolt insertion holes 19 formed in the oil passage constitution member 2.

The fastening bolt 20 is inserted and screwed from the first axial direction X1 side into the bolt through hole 21*b* of the cover housing member PH1*b*, the bolt through hole 21*a* of the rotor accommodation housing member PH1*a*, and the bolt insertion hole 19 of the oil passage constitution member 2 to fix the rotor accommodation housing member PH1*a* and the oil passage constitution member 2 to the cover housing member PH1*b*. The cover housing member PH1*b* is formed integrally with the intermediate wall 18 which constitutes the case CS. The oil passage constitution member 2 is fixed to the case CS.

In addition, the oil passage constitution member 2 includes an electric pump fixation portion 22 for fixation of the electric oil pump EOP. In the embodiment, the bolt insertion holes 19 are also used as the electric pump fixation portion 22 in addition to the case fixation portion 10. In addition, the second pump housing PH2 is provided with a bolt through hole 24 which extends in the axial direction and into which a fastening bolt 23 is inserted. A plurality of bolt through holes 24 are provided in correspondence with the bolt insertion holes 19.

The fastening bolt 23 is inserted and screwed from the second axial direction X2 side into the bolt through hole 24 of the second pump housing PH2 and the bolt insertion hole 19 of the oil passage constitution member 2 to fix the second pump housing PH2 to the oil passage constitution member 2. Hence, the electric oil pump EOP is fixed to the case CS via the oil passage constitution member 2.

5-2. Suction Port and Discharge Port of Mechanical Oil Pump MOP

<First Surface F1>

As illustrated in FIG. 3, the oil passage constitution member 2 includes the first surface F1 which is contacted by an end surface FE1, on the second axial direction X2 side, of the first pump rotor R1 of the mechanical oil pump MOP. The first surface F1 constitutes the accommodation chamber surface 11 which constitutes the inner surface, on the second axial direction X2 side, of the first rotor accommodation chamber 17 which accommodates the first pump rotor R1. That is, the oil passage constitution member 2 also serves as a housing for the mechanical oil pump MOP.

In the embodiment, the first surface F1 is a flat surface that is orthogonal to the first rotational axis A1.

As illustrated in FIGS. 3 and 4, the first surface F1 is provided with: the first suction port PI1 which is dented inwardly of the oil passage constitution member 2 (in the example, toward a second surface F2) and through which oil is supplied to the mechanical oil pump MOP; and the first discharge port PO1 which is dented inwardly of the oil passage constitution member 2 (in the example, toward the second surface F2) and through which oil is discharged from the mechanical oil pump MOP.

<First Suction Port PI1>

The first suction port PI1 is a dented portion on the suction side of the first surface F1 through which oil is supplied to a clearance formed by the first pump rotor R1. Specifically, the first suction port PI1 is an arc-shaped region, of the dented portion on the suction side of the first surface F1, that overlaps, as seen in the axial direction, a clearance formed by the first pump rotor R1 in a region that superposes the first rotor accommodation chamber 17 as seen in the axial direction. In the embodiment, the first suction port PI1 is an arc-shaped region, of the dented portion on the suction side of the first surface F1, that overlaps, as seen in the axial direction, a region in which a clearance between the first outer rotor R1$o$ and the first inner rotor R1$i$ is distributed in the case where the first pump rotor R1 is rotated.

As illustrated in FIG. 4, a rotational direction RD1 (hereinafter referred to as a first rotational direction RD1) of the first pump rotor R1 of the mechanical oil pump MOP is the clockwise direction as seen in the second axial direction X2.

<First Discharge Port PO1>

The first discharge port PO1 is a dented portion on the discharge side of the first surface F1 through which oil is discharged from a clearance formed by the first pump rotor R1. Specifically, the first discharge port PO1 is an arc-shaped region, of the dented portion on the discharge side of the first surface F1, that overlaps, as seen in the axial direction, a clearance formed by the first pump rotor R1 in a region that superposes the first rotor accommodation chamber 17 as seen in the axial direction. In the embodiment, the first discharge port PO1 is an arc-shaped region, of the dented portion on the discharge side of the first surface F1, that overlaps, as seen in the axial direction, a region in which a clearance between the first outer rotor R1$o$ and the first inner rotor R1$i$ is distributed in the case where the first pump rotor R1 is rotated.

5-3. Suction Port and Discharge Port of Electric Oil Pump EOP

<Second Surface F2>

As illustrated in FIG. 3, the oil passage constitution member 2 includes the second surface F2 which faces the direction opposite to the first surface F1 and which is contacted by an end surface FE2, on the first axial direction X1 side, of the second pump rotor R2 of the electric oil pump EOP. The second surface F2 constitutes the accommodation chamber surface 12 which constitutes the inner surface, on the first axial direction X1 side, of the second rotor accommodation chamber 27 which accommodates the second pump rotor R2. That is, the oil passage constitution member 2 also serves as a housing for the electric oil pump EOP.

In the embodiment, the second surface F2 is a flat surface that is orthogonal to the second rotational axis A2, and is parallel to the first surface F1.

Figure 5:
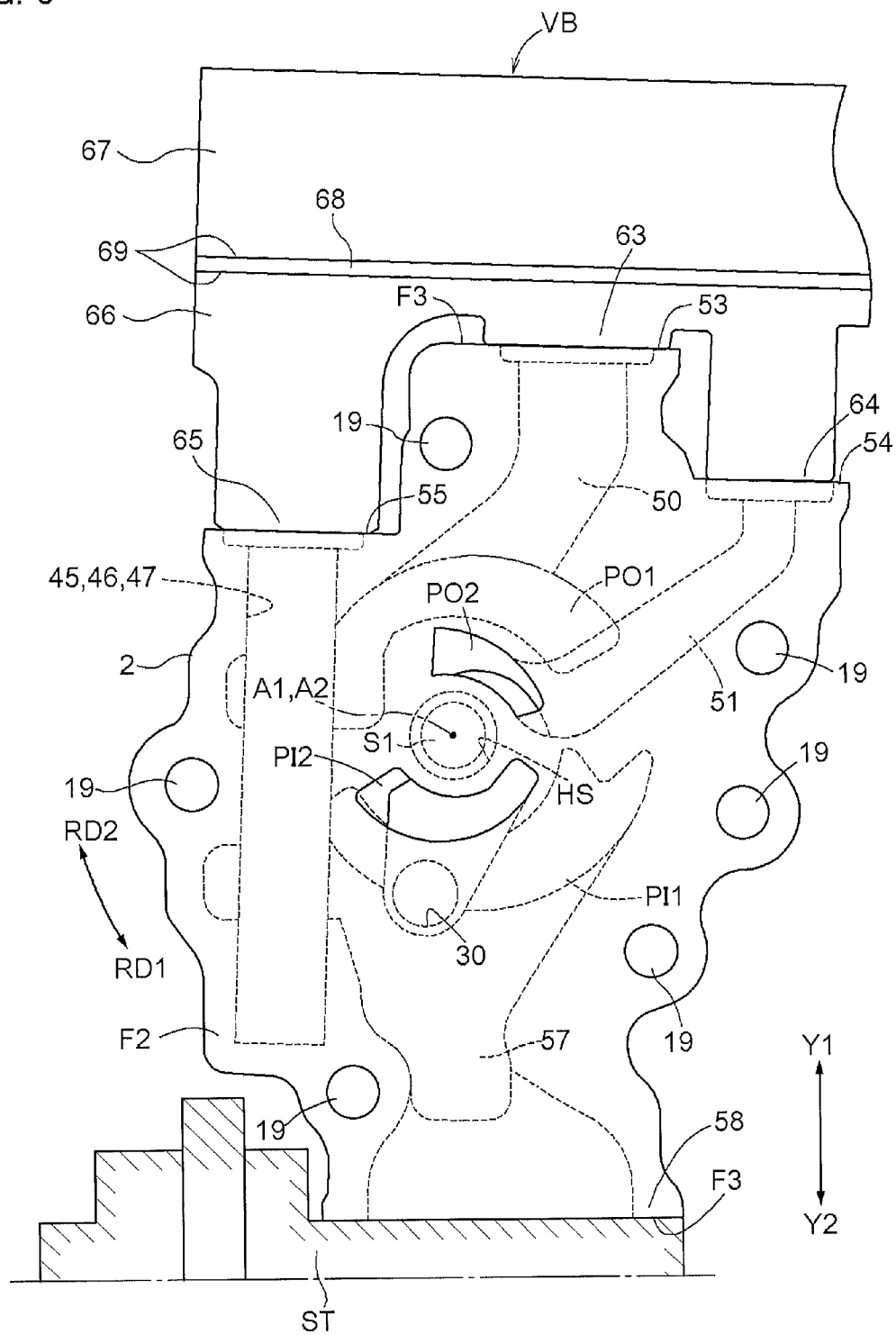
FIG. 5 is a view of the oil passage constitution member according to the embodiment of the present disclosure as seen in the axial direction from the second surface side.

As illustrated in FIGS. 3 and 5, the second surface F2 is provided with: the second suction port PI2 which is dented inwardly of the oil passage constitution member 2 (in the example, toward the first surface F1) and through which oil is supplied to the electric oil pump EOP; and the second discharge port PO2 which is dented inwardly of the oil passage constitution member 2 (in the example, toward the first surface F1) and through which oil is discharged from the electric oil pump EOP.

<Second Suction Port PI2>

The second suction port PI2 is a dented portion on the suction side of the second surface F2 through which oil is supplied to a clearance formed by the second pump rotor R2. Specifically, the second suction port PI2 is an arc-shaped region, of the dented portion on the suction side of the second surface F2, that overlaps, as seen in the axial direction, a clearance formed by the second pump rotor R2 in a region that superposes the second rotor accommodation chamber 27 as seen in the axial direction. In the embodiment, the second suction port PI2 is an arc-shaped region, of the dented portion on the suction side of the second surface F2, that overlaps, as seen in the axial direction, a region in which a clearance between the second outer rotor R2$o$ and the second inner rotor R2$i$ is distributed in the case where the second pump rotor R2 is rotated.

As illustrated in FIG. 5, a rotational direction RD2 (hereinafter referred to as a second rotational direction RD2) of the second pump rotor R2 of the electric oil pump EOP is the clockwise direction as seen in the first axial direction X1. As illustrated in FIG. 4, the second rotational direction RD2 of the electric oil pump EOP is the counterclockwise direction as seen in the second axial direction X2. Hence, the second rotational direction RD2 of the electric oil pump EOP and the first rotational direction RD1 of the mechanical oil pump MOP are opposite to each other.

<Second Discharge Port PO2>

The second discharge port PO2 is a dented portion on the discharge side of the second surface F2 through which oil is discharged from a clearance formed by the second pump rotor R2. The second discharge port PO2 is an arc-shaped region, of the dented portion on the discharge side of the second surface F2, that overlaps, as seen in the axial direction, a clearance formed by the second pump rotor R2 in a region that superposes the second rotor accommodation chamber 27 as seen in the axial direction. In the embodiment, the second discharge port PO2 is an arc-shaped region, of the dented portion on the discharge side of the second surface F2, that overlaps, as seen in the axial direction, a region in which a clearance between the second outer rotor R2$o$ and the second inner rotor R2$i$ is distributed in the case where the second pump rotor R2 is rotated.

5-4. Suction Oil Passage

The oil passage constitution member 2 includes a suction oil passage 57 through which oil suctioned by the first pump rotor R1 flows. In the embodiment, the suction oil passage 57 is also used as a suction oil passage through which oil suctioned by the second pump rotor R2 flows. That is, the suction oil passage 57 is commonly used by the first pump rotor R1 and the second pump rotor R2. The suction oil passage 57 communicates with both the first suction port PI1 and the second suction port PI2 to supply oil.

The oil passage constitution member 2 includes a suction joint portion 58 in which an opening of the suction oil passage 57 is formed. The suction joint portion 58 is formed in an outer peripheral surface F3 that surrounds the respective outer edges of the first surface F1 and the second surface F2. A portion (hereinafter referred to as a formation surface) of the outer peripheral surface F3 in which the suction joint portion 58 is formed is a flat surface that is parallel to the axial direction, and the opening which is formed in the suction joint portion 58 opens radially outward.

A joint portion of a strainer ST is joined to the suction joint portion 58 so that the suction oil passage 57 and the strainer ST are connected to each other. The strainer ST is disposed in an oil reservoir such as an oil pan OP so that oil is supplied from the strainer ST to the suction oil passage 57.

The oil passage constitution member 2 includes a strainer fixation portion (not illustrated) that fixes the strainer ST. In the embodiment, a bolt insertion hole (not illustrated) is formed in the formation surface of the suction joint portion 58. The bolt insertion hole extends in a direction that is orthogonal to the formation surface, and female threads are formed in the bolt insertion hole. A fastening bolt is inserted and screwed into a bolt through hole formed in the strainer ST and a bolt insertion hole of the oil passage constitution member 2 to fix the strainer ST to the oil passage constitution member 2 (not illustrated). Hence, the strainer ST is fixed to the case CS via the oil passage constitution member 2.

5-5. Discharge Oil Passage

The oil passage constitution member 2 includes the first discharge oil passage 50 through which oil discharged by the first pump rotor R1 flows. The first discharge oil passage 50 is an oil passage configured to transport oil supplied from the first discharge port PO1. The first discharge oil passage 50 extends radially outward with reference to the first rotational axis A1 from the first discharge port PO1 to the opening in the first member joint portion 53.

In addition, the oil passage constitution member 2 includes the second discharge oil passage 51 through which oil discharged from the auxiliary hydraulic pressure source flows. In the embodiment, oil discharged by the second pump rotor R2 flows through the second discharge oil passage 51. The second discharge oil passage 51 is an oil passage configured to transport oil supplied from the second discharge port PO2. The second discharge oil passage 51 extends radially outward with reference to the second rotational axis A2 from the second discharge port PO2 to the opening in the second member joint portion 54.

As illustrated in FIGS. 1 and 4, the first discharge oil passage 50 and the second discharge oil passage 51 are formed independently of each other. Here, the term "independently" means that the first discharge oil passage 50 and the second discharge port PO2 do not communicate with each other in the oil passage constitution member 2.

The first discharge oil passage 50 is connected to the first body oil passage 60 in the valve body VB. The second discharge oil passage 51 is connected to the second body oil passage 61 in the valve body VB. As illustrated in FIG. 1, the first body oil passage 60 and the second body oil passage 61 are merged in the valve body VB. A first check valve 70, which is a check valve that prevents reverse flow toward the first pump rotor R1, is provided in the first body oil passage 60. A second check valve 71, which is a check valve that prevents reverse flow toward the second pump rotor R2, is provided in the second body oil passage 61. That is, the first check valve 70 and the second check valve 71 are not provided in the oil passage constitution member 2 but provided in the valve body VB. With the first check valve 70 and the second check valve 71 provided outside the oil passage constitution member 2, it is possible to suppress an increase in width (length in the axial direction) of the oil passage constitution member 2.

As illustrated in FIG. 6, the oil passage constitution member 2 includes the first member joint portion 53 in which an opening of the first discharge oil passage 50 is formed. The first member joint portion 53 is formed in the outer peripheral surface F3 which surrounds the respective outer edges of the first surface F1 and the second surface F2. The first discharge oil passage 50 and the first body oil passage 60 are connected to each other with the first member joint portion 53 and the first body joint portion 63 joined to each other as located opposite to each other. Here, the phrase "a joint portion of the oil passage constitution member 2 and a joint portion of the valve body VB are joined to each other as located opposite to each other" refers to a state in which the two joint portions are joined to each other not via the case CS, and in which the two joint portions are connected to each other as located opposite to each other directly or via a linear tubular member.

In the embodiment, the first member joint portion 53 and the first body joint portion 63 are connected to each other directly as located opposite to each other. The inside diameter of the opening in the first member joint portion 53 is larger than the inside diameter of the first discharge oil passage 50 so that the projection portion of the first body joint portion 63 is fitted inside the opening in the first member joint portion 53. The first member joint portion 53 and the first body joint portion 63 may be joined to each other via a seal member with a seal member such as a gasket fitted inside the opening in the first member joint portion 53.

In addition, the oil passage constitution member 2 includes the second member joint portion 54 in which an opening of the second discharge oil passage 51 is formed. The second member joint portion 54 is formed in the outer peripheral surface F3. The second discharge oil passage 51 and the second body oil passage 61 are connected to each other with the second member joint portion 54 and the second body joint portion 64 joined to each other as located opposite to each other. In the embodiment, the second member joint portion 54 and the second body oil passage 61 are connected to each other directly as located opposite to each other. The inside diameter of the opening in the second member joint portion 54 is larger than the inside diameter of the second discharge oil passage 51 so that the projection portion of the second body joint portion 64 is fitted inside the opening in the second member joint portion 54. The second member joint portion 54 and the second body joint portion 64 may be joined to each other via a seal member with a seal member such as a gasket fitted inside the opening in the second member joint portion 54.

5-6. Return Hole

As illustrated in FIGS. 1 and 6, the oil passage constitution member 2 includes a return hole 46 configured to return oil discharged by the first pump rotor R1 to the suction oil passage 57, and the third member joint portion 55 in which an opening of the return hole 46 is formed. In the embodiment, the return hole 46 includes a discharge return oil passage 45 that communicates with the first discharge oil passage 50 and that returns oil in the first discharge oil passage 50 to the suction oil passage 57. In addition, the return hole 46 accommodates the return oil passage control valve 40 which controls the degree of opening of the discharge return oil passage 45. The opening of the return hole 46 is an opening through which a command hydraulic pressure for operation of the return oil passage control valve 40 is supplied to the return oil passage control valve 40. The third body oil passage 62 is an oil passage through which the command hydraulic pressure is supplied. That is, a portion of the return hole 46 on the opening side serves as the command pressure oil passage 47 through which the command hydraulic pressure for operation of the return oil passage control valve 40 flows.

The discharge return oil passage 45 is used, in the case where the amount of oil discharged from the mechanical oil pump MOP is larger than the required amount of oil, to return excess oil to the suction oil passage 57 before the excess oil is supplied to the hydraulic control device PC (valve body VB). If the excess oil is supplied to the hydraulic control device PC, the excess oil flows through an oil passage in the valve body VB, and is drained from a hydraulic control valve and returned to the oil pan OP, and suctioned again from the strainer ST. Therefore, the excess oil flows through a long oil passage with an increased conduit resistance, which increases the drive load on the mechanical oil pump MOP. If the excess oil is returned to the suction oil passage 57 by taking a shortcut through the discharge return oil passage 45, on the other hand, the excess oil flows through a short oil passage with a reduced conduit resistance. Therefore, it is possible to reduce the drive load on the mechanical oil pump MOP, and to improve the fuel efficiency.

In the embodiment, a part of the return hole 46 which accommodates a spool 41 of the return oil passage control valve 40 constitutes the discharge return oil passage 45 and the command pressure oil passage 47. The return hole 46 is formed in a circular columnar shape, and opens toward the valve body VB. The return hole 46 communicates with the suction oil passage 57, and communicates with the first discharge oil passage 50.

The spool 41 is constituted by combining a plurality of circular columnar members. The diameter of an end portion 42, on the discharge side, and an end portion 43, on the suction side, of the spool 41 in the axial direction matches the diameter of the return hole 46. The diameter of an intermediate portion 44 of the spool 41 located between the end portion 42 on the discharge side and the end portion 43 on the suction side is smaller than the diameter of the return hole 46. A cylindrical clearance between the outer peripheral surface of the intermediate portion 44 and the inner peripheral surface of the return hole 46 serves as the discharge return oil passage 45.

A command hydraulic pressure acts on an end surface 48 (hereinafter referred to as a command pressure supply surface 48), on the discharge side, at the end portion 42, on the discharge side, of the spool 41. A portion of the return hole 46 located on the discharge side with respect to the command pressure supply surface 48 serves as the command pressure oil passage 47. A portion of the return hole 46 in which an opening on the discharge side is formed serves as the third member joint portion 55 in which an opening of the command pressure oil passage 47 is formed. The third member joint portion 55 is formed in the outer peripheral surface F3.

The spool 41 is pushed toward the suction side by a pressing force that matches the command hydraulic pressure. A spring 49 is provided on the suction side of the end portion 43, on the suction side, of the spool 41. The spool 41 is pushed toward the discharge side by the pressing force of the spring 49.

In the case where the command hydraulic pressure is not supplied, as illustrated in FIG. 6, the spool 41 is moved to the end of movement, on the discharge side, of the spool 41 by the pressing force of the spring 49, which allows communication between the discharge return oil passage 45 and the first discharge oil passage 50 but blocks communication between the discharge return oil passage 45 and the suction oil passage 57. When the pressing force of the command hydraulic pressure exceeds the pressing force of the spring 49, on the other hand, the spool 41 is moved toward the suction side, which allows communication between the discharge return oil passage 45 and the first discharge oil passage 50 and also allows communication between the discharge return oil passage 45 and the suction oil passage 57. The degree of opening for communication between the discharge return oil passage 45 and the suction oil passage 57 is increased and decreased in accordance with the pressing force of the command hydraulic pressure, which increases and decreases the amount of oil returned from the first discharge oil passage 50 to the suction oil passage 57.

The third body oil passage 62 is connected to the return hole 46 (command pressure oil passage 47) with the third member joint portion 55 and the third body joint portion 65 of the valve body VB joined to each other as located opposite to each other. In the embodiment, the third member joint portion 55 and the third body joint portion 65 are connected to each other directly as located opposite to each other. The third member joint portion 55 is formed in the outer peripheral surface F3. In the embodiment, the inside diameter of the opening in the third member joint portion 55 is larger than the inside diameter of the command pressure oil passage 47 (return hole 46) so that the projection portion of the third body joint portion 65 is fitted inside the opening in the third member joint portion 55. The third member joint portion 55 and the third body joint portion 65 may be joined to each other via a seal member with a seal member such as a gasket fitted inside the opening in the third member joint portion 55.

5-6. Arrangement

The first member joint portion 53, the second member joint portion 54, and the third member joint portion 55 are formed in surfaces that are parallel to each other, and formed in a surface that is parallel to the extension direction (axial direction) of the first rotational axis A1.

The second member joint portion 54, the first member joint portion 53, and the third member joint portion 55 are disposed in this order from one side in the circumferential direction with reference to the first rotational axis A1.

Here, a direction which is perpendicular to the formation surface in which the first member joint portion 53 is formed is defined as a joint portion-perpendicular direction. A direction from the oil passage constitution member 2 toward the valve body VB (toward the upper side in FIGS. 4 to 6) in the joint portion-perpendicular direction is defined as a first joint portion-perpendicular direction Y1. The opposite direction from the valve body VB toward the oil passage constitution member 2 (toward the lower side in FIGS. 4 to 6) is defined as a second joint portion-perpendicular direction Y2.

The first body joint portion 63, the second body joint portion 64, and the third body joint portion 65 are formed in surfaces that are parallel to each other.

With the member joint portions 53, 54, and 55 and the body joint portions 63, 64, and 65 joined to each other, the formation surfaces in which the member joint portions 53, 54, and 55 and the formation surfaces in which the body joint portions 63, 64, and 65 are formed are parallel to each other. In this state, the formation surface of the first member joint portion 53 is parallel to the superposed surfaces 69 of the valve body VB, and the joint portion-perpendicular direction is perpendicular to the superposed surfaces 69.

In the embodiment, as illustrated in FIGS. 4 to 6, the first suction port PI1 and the second suction port PI2 are formed on the second joint portion-perpendicular direction Y2 side with respect to the first rotational axis A1, and the suction oil passage 57 extends in the second joint portion-perpendicular direction Y2 from the first suction port PI1 and the second suction port PI2.

The formation surface in which the suction joint portion 58 of the suction oil passage 57 is formed is a flat surface that is parallel to the formation surface of the first member joint portion 53 and that faces the side opposite to the formation surface of the first member joint portion 53. The opening formed in the suction joint portion 58 opens toward the second joint portion-perpendicular direction Y2. The strainer ST is disposed on the second joint portion-perpendicular direction Y2 side with respect to the formation surface of the suction joint portion 58.

On the other hand, the first discharge port PO1 and the second discharge port PO2 are formed on the first joint portion-perpendicular direction Y1 side with respect to the first rotational axis A1, and the first discharge oil passage 50 and the second discharge oil passage 51 extend radially outward from the first discharge port PO1 and the second discharge port PO2, respectively.

The first discharge oil passage 50 and the second discharge oil passage 51 are formed so as not to overlap each other as seen in the axial direction as illustrated in FIGS. 4 to 6, but so as to overlap each other as seen in the circumferential direction as illustrated in FIG. 3. Thus, the width (length in the axial direction) of the oil passage constitution member 2 can be made thin even if the two discharge oil passages are provided.

As illustrated in FIG. 4, the first rotational direction RD1 of the first pump rotor R1 and the second rotational direction RD2 of the second pump rotor R2 are opposite to each other as seen in the second axial direction X2. Therefore, the connection portion between the first discharge oil passage 50 and the first discharge port PO1 is disposed on the first rotational direction RD1 side of the first discharge port PO1, and the connection portion between the second discharge oil passage 51 and the second discharge port PO2 is disposed on the second rotational direction RD2 side of the second discharge port PO2. Therefore, the first discharge oil passage 50 and the second discharge oil passage 51 can be disposed so as not to overlap each other as seen in the axial direction.

The first discharge oil passage 50 extends in the first joint portion-perpendicular direction Y1. The second discharge oil passage 51 is disposed on the second rotational direction RD2 side with respect to the first discharge oil passage 50.

The formation surface in which the first member joint portion 53 of the first discharge oil passage 50 is formed and the formation surface in which the second member joint portion 54 of the second discharge oil passage 51 is formed are flat surfaces that are parallel to each other and that face the first joint portion-perpendicular direction Y1. The openings formed in the first member joint portion 53 and the second member joint portion 54 open toward the first joint portion-perpendicular direction Y1.

The discharge return oil passage 45, the return hole 46, and the command pressure oil passage 47 are disposed on the first rotational direction RD1 side with respect to the first discharge oil passage 50 and on the second rotational direction RD2 side with respect to the suction oil passage 57, and extend in the first joint portion-perpendicular direction Y1.

The discharge return oil passage 45, the return hole 46, and the command pressure oil passage 47 are formed so as not to overlap the first discharge oil passage 50, the second discharge oil passage 51, and the suction oil passage 57 as seen in the axial direction, but so as to overlap the first discharge oil passage 50, the second discharge oil passage 51, and the suction oil passage 57 as seen in the circumferential direction, except for a communication portion between the first discharge oil passage 50 and the suction oil passage 57. Hence, the width (length in the axial direction) of the oil passage constitution member 2 can be kept thin even if the discharge return oil passage 45, the return hole 46, and the command pressure oil passage 47 are provided.

The formation surface in which the third member joint portion 55 of the command pressure oil passage 47 is formed is a flat surface that is parallel to the formation surface of the first member joint portion 53 and that faces the first joint portion-perpendicular direction Y1. The opening formed in the third member joint portion 55 opens toward the first joint portion-perpendicular direction Y1.

In the oil passage constitution member 2, the second member joint portion 54, the first member joint portion 53, and the third member joint portion 55 are disposed in this order from the second rotational direction RD2 side toward the first rotational direction RD1 side in the circumferential direction with reference to the first rotational axis A1. Thus, the first member joint portion 53 is disposed between the second member joint portion 54 and the third member joint portion 55, and thus the first discharge oil passage 50 can be extended in the first joint portion-perpendicular direction Y1 toward the valve body VB as described above. Hence, it is possible to reduce the number of bends of the oil passage through the first discharge oil passage 50, and to shorten the length of the oil passage to a minimum, which can reduce the pressure loss. The discharge capacity of the mechanical oil pump MOP is larger than the discharge capacity of the electric oil pump EOP, which achieves a greater effect in reducing the pressure loss.

In addition, the first discharge oil passage 50 and the second discharge oil passage 51 are connected to the first body oil passage 60 and the second body oil passage 61, respectively, in the valve body VB directly and not via an oil passage formed in the case CS between the first discharge oil passage 50 and the second discharge oil passage 51. Thus, the oil passage can be shortened, which can reduce the pressure loss.

Other Embodiments

Lastly, other embodiments of the present disclosure will be described. The configuration of each embodiment described below is not limited to its independent application, and may be applied in combination with the configuration of other embodiments unless any contradiction occurs.

(1) In the embodiment described above, the internal combustion engine ENG is provided as a drive force source for the wheels W. However, embodiments of the present disclosure are not limited thereto. That is, an electric motor that functions as an electric motor and an electric generator may be provided as a drive force source for the wheels W in addition to the internal combustion engine ENG. Alternatively, an electric motor may be provided as a drive force source for the wheels W rather than the internal combustion engine ENG.

(2) In the embodiment described above, the oil passage constitution member 2 is composed of two members, namely the member 2a on the first axial direction X1 side and the member 2b on the second axial direction X2 side. However, embodiments of the present disclosure are not limited thereto. That is, the oil passage constitution member 2 may be composed of a single member, or may be composed of three or more members.

(3) In the embodiment described above, the first rotational axis A1 and the second rotational axis A2 match each other, and are parallel to each other. However, embodiments of the present disclosure are not limited thereto. That is, the first rotational axis A1 and the second rotational axis A2 may be disposed in parallel with each other but not match each other. Alternatively, the first rotational axis A1 and the second rotational axis A2 may be disposed in directions that intersect each other (including a three-dimensional intersection) rather than being disposed in parallel with each other. In addition, the first surface F1 and the second surface F2 may be disposed in directions that intersect each other rather than being disposed in parallel with each other.

(4) In the embodiment described above, the first discharge oil passage 50 and the second discharge oil passage 51 are formed independently of each other. However, embodiments of the present disclosure are not limited thereto. That is, the first discharge oil passage 50 and the second discharge oil passage 51 may be formed so as to communicate with each other via a check valve or the like, or the first discharge oil passage 50 and the second discharge oil passage 51 may be integrated into a common discharge oil passage.

(5) In the embodiment described above, the suction oil passage 57 is commonly used by the first pump rotor R1 and the second pump rotor R2. However, embodiments of the present disclosure are not limited thereto. That is, a suction oil passage through which oil is supplied to the first pump rotor R1 and a suction oil passage through which oil is supplied to the second pump rotor R2 may be formed independently of each other.

(6) In the embodiment described above, the strainer ST is directly connected to the suction joint portion 58. However, embodiments of the present disclosure are not limited thereto. That is, the strainer ST may be connected to the suction joint portion 58 via an oil passage formed in another member or the like.

(7) In the embodiment described above, the vehicle hydraulic pressure supply device 1 includes the electric oil pump EOP; the oil passage constitution member 2 includes the second discharge oil passage 51, the second member joint portion 54, the second suction port PI2, and the second discharge port PO2; and the valve body VB includes the second body oil passage 61 and the second body joint portion 64. However, embodiments of the present disclosure are not limited thereto. That is, the vehicle hydraulic pressure supply device 1 may not include the electric oil pump EOP; the oil passage constitution member 2 may not include the second discharge oil passage 51 etc.; and the valve body VB may not include the second body oil passage 61 etc.

(8) In the embodiment described above, the oil passage constitution member 2 includes the discharge return oil passage 45, the return hole 46, the command pressure oil passage 47, and the third member joint portion 55; and the valve body VB includes the third body oil passage 62 and the third body joint portion 65. However, embodiments of the present disclosure are not limited thereto. That is, the oil passage constitution member 2 may not include the discharge return oil passage 45, the return hole 46, the command pressure oil passage 47, and the third member joint portion 55; and the valve body VB may not include the third body oil passage 62 and the third body joint portion 65.

(9) In the embodiment described above, the first member joint portion 53, the second member joint portion 54, and the third member joint portion 55 are formed in surfaces that are parallel to each other. However, embodiments of the present disclosure are not limited thereto. That is, the first member joint portion 53, the second member joint portion 54, and the third member joint portion 55 may be formed in the same surface. Alternatively, the first member joint portion 53, the second member joint portion 54, and the third member joint portion 55 may be formed in surfaces that are not parallel to each other.

(10) In the embodiment described above, the first body joint portion 63, the second body joint portion 64, and the third body joint portion 65 are formed in surfaces that are parallel to each other. However, embodiments of the present disclosure are not limited thereto. That is, the first body joint portion 63, the second body joint portion 64, and the third body joint portion 65 may be formed in the same surface. Alternatively, the first body joint portion 63, the second body joint portion 64, and the third body joint portion 65 may be formed in surfaces that are not parallel to each other.

(11) In the embodiment described above, the first discharge oil passage 50, the second discharge oil passage 51, the discharge return oil passage 45, and so forth are formed so as not to overlap each other as seen in the axial direction, but so as to overlap each other as seen in the circumferential direction. However, embodiments of the present disclosure are not limited thereto. That is, the first discharge oil passage 50, the second discharge oil passage 51, the discharge return oil passage 45, and so forth may be formed so as to overlap each other as seen in the axial direction, or so as not to overlap each other as seen in the circumferential direction.

(12) In the embodiment described above, the second member joint portion 54, the first member joint portion 53, and the third member joint portion 55 are disposed in this order from one side in the circumferential direction with reference to the first rotational axis A1. However, embodiments of the present disclosure are not limited thereto. That is, such components may be disposed in any order, or may be disposed in any arrangement such as an arrangement in which the components are disposed so as to overlap each other as seen in the axial direction.

Figure 7:
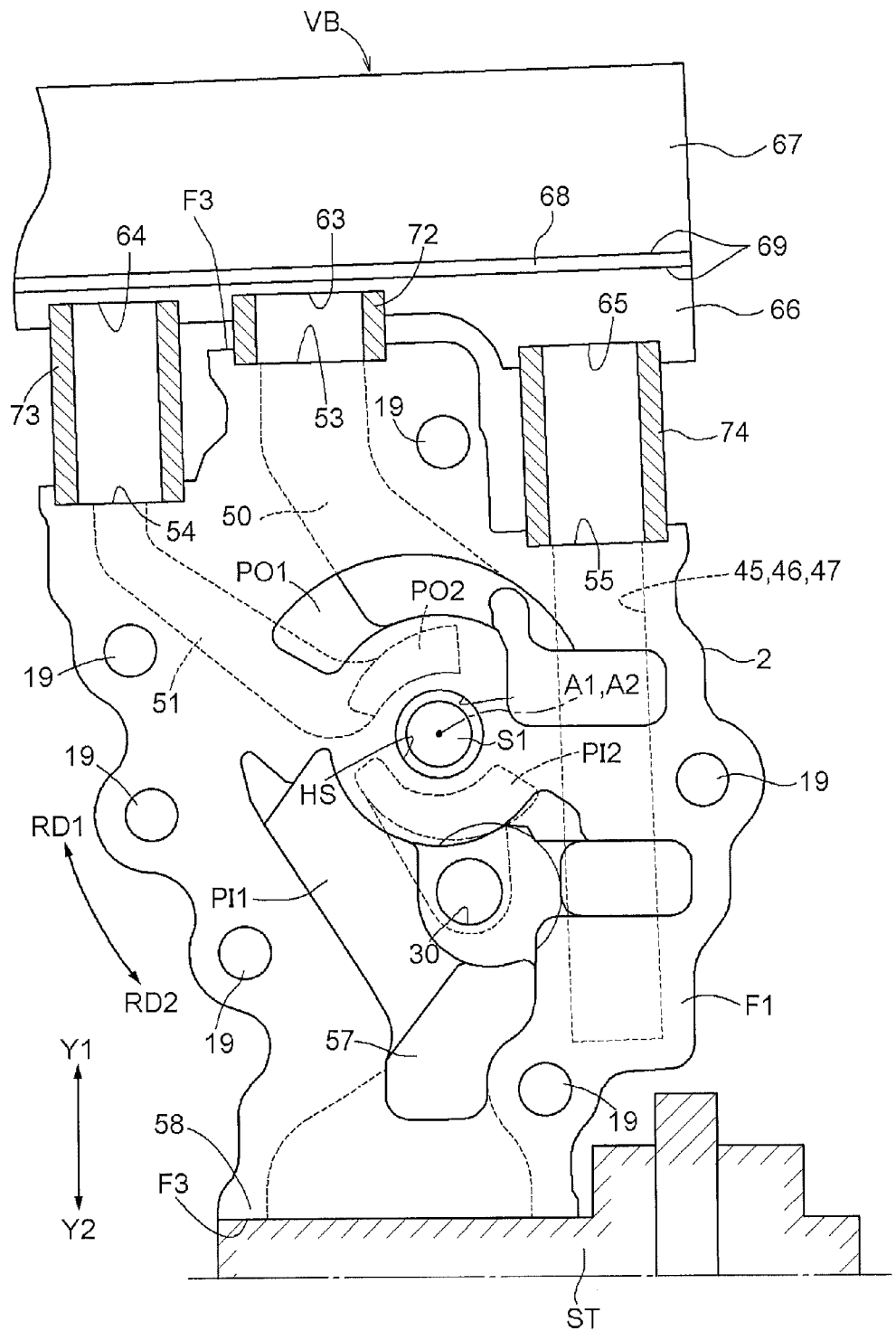
FIG. 7 is a view of an oil passage constitution member according to another embodiment of the present disclosure as seen in the axial direction from the first surface side.

(13) In the embodiment described above, the first member joint portion 53 and the first body joint portion 63 are connected to each other directly as located opposite to each other. However, embodiments of the present disclosure are not limited thereto. That is, as illustrated in FIG. 7, the first member joint portion 53 and the first body joint portion 63 may be connected to each other as located opposite to each other via a tubular member 72 that is tubular and that extends linearly. In addition, the second member joint portion 54 and the second body joint portion 64 may be connected to each other as located opposite to each other via a tubular member 73 that is tubular and that extends linearly. The third member joint portion 55 and the third body joint portion 65 may be connected to each other as located opposite to each other via a tubular member 74 that is tubular and that extends linearly. In the example illustrated in FIG. 7, the tubular members 72, 73, and 74 are formed in a cylindrical shape.

Figure 8:
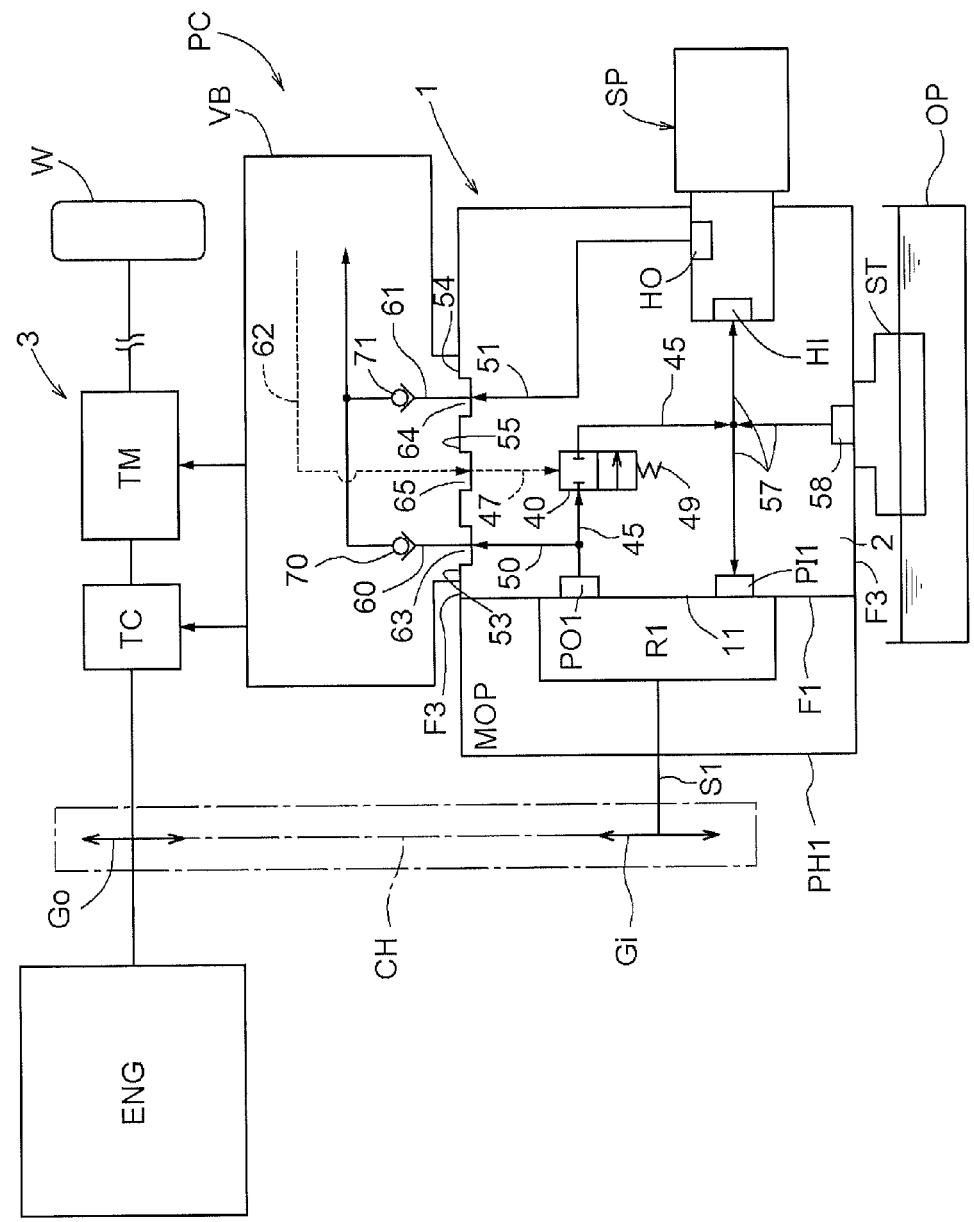
FIG. 8 is a schematic diagram illustrating a schematic configuration of a vehicle hydraulic pressure supply device according to another embodiment of the present disclosure.

(14) In the embodiment described above, the auxiliary hydraulic pressure source is an electric oil pump driven by the electric motor MG. However, embodiments of the present disclosure are not limited thereto. That is, as illustrated in FIG. 8, the auxiliary hydraulic pressure source may be an electromagnetic pump SP driven by an electromagnetic actuator. The electromagnetic pump SP is an oil pump driven by a drive force of the electromagnetic actuator to suction oil from a suction hole HI and discharge the oil to a discharge hole HO. The electromagnetic pump SP may be implemented using a pump that repeatedly suctions and discharges oil through reciprocal motion of a plunger (piston) by an electromagnetic force. The suction oil passage 57 communicates with the suction hole HI, and supplies oil to the suction hole HI. The second discharge oil passage 51 communicates with the discharge hole HO, and oil discharged from the discharge hole HO flows through the second discharge oil passage 51.

Figure 9:
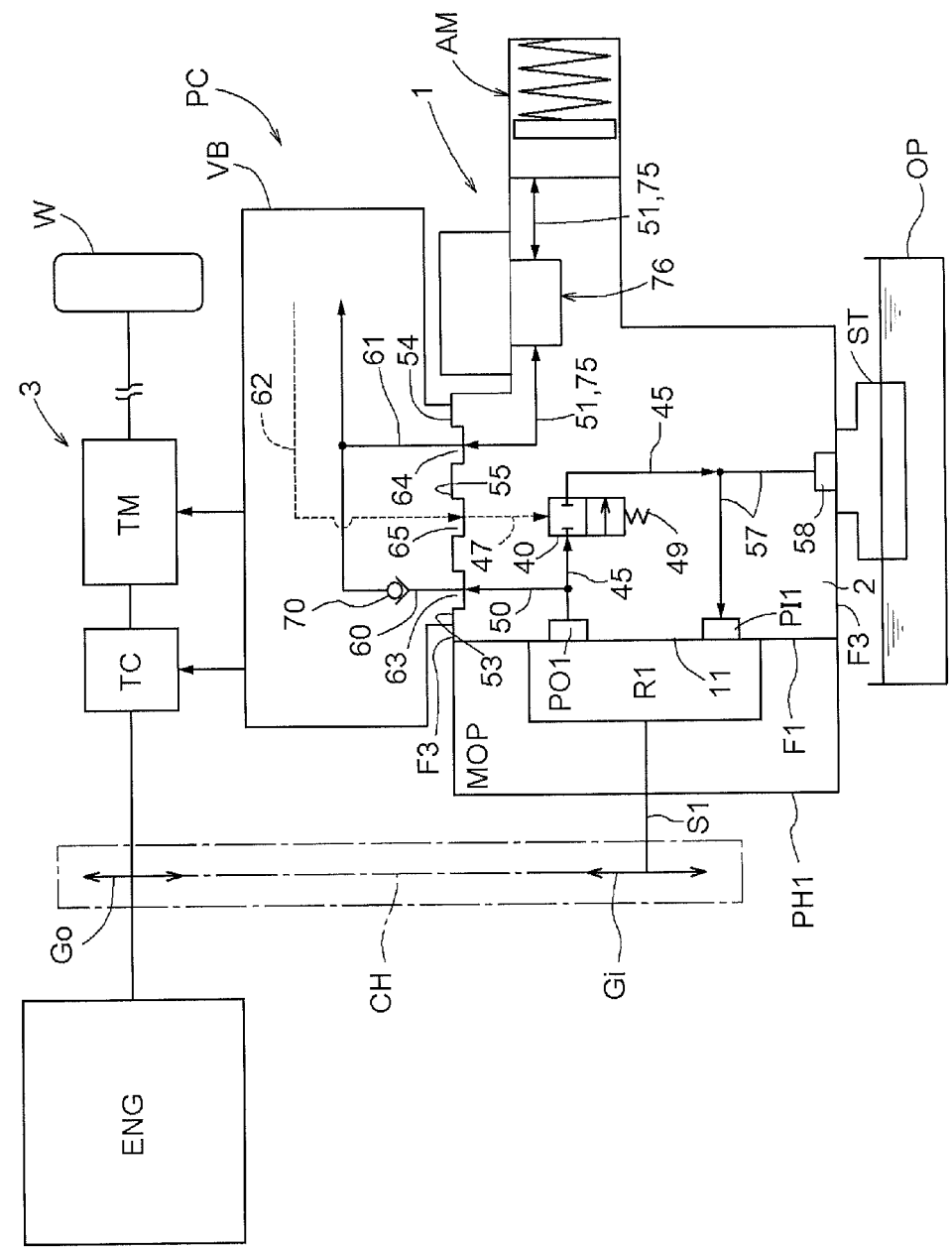
FIG. 9 is a schematic diagram illustrating a schematic configuration of a vehicle hydraulic pressure supply device according to another embodiment of the present disclosure.

Alternatively, as illustrated in FIG. 9, the auxiliary hydraulic pressure source may be an accumulator AM. The accumulator AM is a pressure accumulator that accumulates a hydraulic pressure generated by the mechanical oil pump MOP inside and that discharges the accumulated hydraulic pressure toward the valve body VB as necessary. In the example illustrated in FIG. 9, the second discharge oil passage 51 through which a hydraulic pressure discharged from the accumulator AM flows and a supply oil passage 75 through which a hydraulic pressure generated by the mechanical oil pump MOP is supplied to the accumulator AM are used as a common oil passage. In addition, the accumulator AM includes an electromagnetic valve 76 provided in the common oil passage 51, 75, and can block and allow flow of oil in the common oil passage 51, 75. The electromagnetic valve 76 is opened in the case where a hydraulic pressure generated by the mechanical oil pump MOP is supplied to the accumulator AM to be accumulated, and in the case where a hydraulic pressure accumulated in the accumulator AM is discharged toward the valve body VB. The electromagnetic valve 76 is closed in the other cases. As in the embodiment described above, the second discharge oil passage 51, which is used as a common oil passage, is connected to the second body oil passage 61 in the valve body VB via the joint portion between the second member joint portion 54 and the second body joint portion 64. The second body oil passage 61 is connected to the first body oil passage 60, to which a hydraulic pressure generated by the mechanical oil pump MOP is supplied, in the valve body VB. Unlike the embodiment described above, the second body oil passage 61 does not include the second check valve 71, and instead the oil passage constitution member 2 includes the electromagnetic valve 76. Hence, a hydraulic pressure generated by the mechanical oil pump MOP is supplied to the accumulator AM via the first discharge oil passage 50, the first body oil passage 60, the second body oil passage 61, and the second discharge oil passage 51 (common oil passage).

Figure 10:
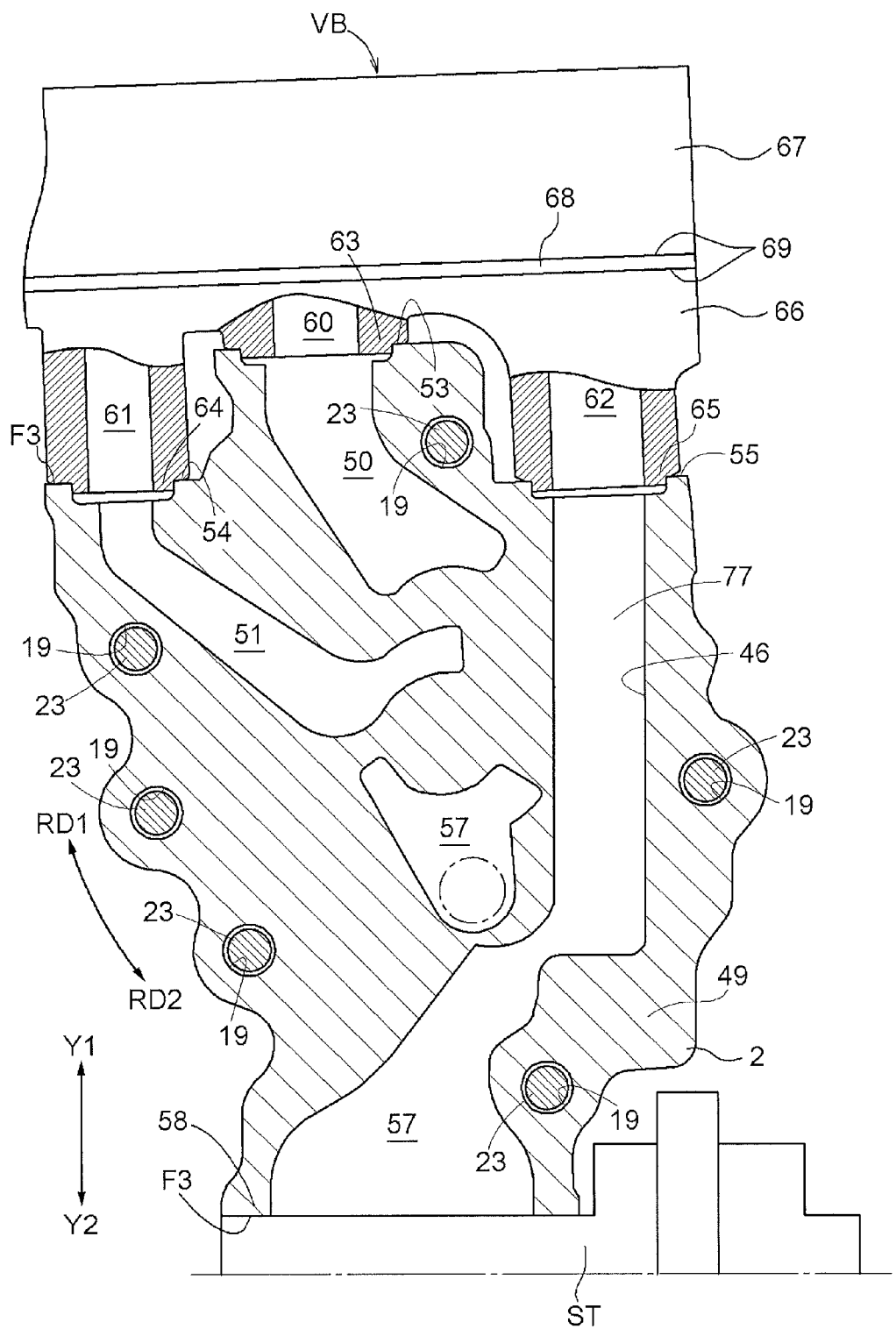
FIG. 10 illustrates a radial sectional view of an oil passage constitution member according to another embodiment of the present disclosure as seen in the axial direction from the first surface side.

(15) In the embodiment described above, the return hole 46 includes the discharge return oil passage 45 through which oil in the first discharge oil passage 50 is returned to the suction oil passage 57, the return oil passage control valve 40 is accommodated in the return hole 46, the opening of the return hole 46 is an opening through which a command hydraulic pressure is supplied, and the third body oil passage 62 is an oil passage through which the command hydraulic pressure is supplied. However, embodiments of the present disclosure are not limited thereto. That is, as illustrated in FIG. 10, the return hole 46 may be a body return oil passage 77 through which oil in the third body oil passage 62 is returned to the suction oil passage 57, the opening of the return hole 46 may be an opening through which oil to be returned to the suction oil passage 57 is supplied, and the third body oil passage 62 may be an oil passage through which oil discharged from the hydraulic control valve of the valve body VB flows. In this case, the return hole 46 communicates with the suction oil passage 57, but does not communicate with the first discharge oil passage 50.

INDUSTRIAL APPLICABILITY

The present disclosure may be suitably applied to a vehicle hydraulic pressure supply device that includes a mechanical oil pump driven by a drive force source for wheels, an oil passage constitution member in which an oil passage connected to the mechanical oil pump is formed, and a hydraulic control device that controls a hydraulic pressure supplied from the mechanical oil pump via the oil passage constitution member and that supplies the hydraulic pressure to a vehicle drive transmission device.

The invention claimed is:

1. A vehicle hydraulic pressure supply device comprising:
   a mechanical oil pump driven by a drive force source for wheels;
   an oil passage constitution member in which an oil passage connected to the mechanical oil pump is formed; and
   a hydraulic control device that controls a hydraulic pressure supplied from the mechanical oil pump via the oil passage constitution member and that supplies the hydraulic pressure to a vehicle drive transmission device, wherein
   a rotary shaft of the mechanical oil pump is disposed on a shaft that is different from an input shaft which is a shaft that serves as a portion of the vehicle drive transmission device to be coupled to the drive force source;
   the oil passage constitution member includes
      an accommodation chamber surface that constitutes a rotor accommodation chamber that accommodates a first pump rotor which is a pump rotor of the mechanical oil pump,
      a first discharge oil passage through which oil discharged by the first pump rotor flows, and
      a first member joint portion in which an opening of the first discharge oil passage is formed;
   the hydraulic control device includes a valve body in which an oil passage configured to adjust a hydraulic pressure to be supplied to respective supply target portions of the vehicle drive transmission device and an accommodation chamber that accommodates a hydraulic control valve that controls the hydraulic pressure are formed;
   the valve body includes a first body oil passage, and a first body joint portion in which an opening of the first body oil passage is formed; and
   the first discharge oil passage and the first body oil passage are connected to each other with the first member joint portion and the first body joint portion joined to each other as located opposite to each other.

2. The vehicle hydraulic pressure supply device according to claim 1, wherein
   the oil passage constitution member further includes a first surface contacted by an axial end surface of the first pump rotor, the first surface being provided with a first discharge port which is dented inwardly of the oil passage constitution member and through which oil is discharged from the mechanical oil pump; and
   the first discharge oil passage extends radially outward with reference to a rotational axis of the mechanical oil pump from the first discharge port to the opening in the first member joint portion.

3. The vehicle hydraulic pressure supply device according to claim 1, wherein
   the first member joint portion and the first body joint portion are connected to each other as located opposite to each other directly or via a tubular member that is tubular and that extends linearly.

4. The vehicle hydraulic pressure supply device according to claim 1, further comprising:

an auxiliary hydraulic pressure source, wherein
the oil passage constitution member further includes
  a second discharge oil passage through which oil discharged from the auxiliary hydraulic pressure source flows, and
  a second member joint portion in which an opening of the second discharge oil passage is formed;
the valve body further includes a second body oil passage, and a second body joint portion in which an opening of the second body oil passage is formed; and
the second discharge oil passage and the second body oil passage are connected to each other with the second member joint portion and the second body joint portion joined to each other as located opposite to each other.

5. The vehicle hydraulic pressure supply device according to claim 4, wherein
the auxiliary hydraulic pressure source is an electric oil pump driven by an electric motor, an electromagnetic pump driven by an electromagnetic actuator, or an accumulator.

6. The vehicle hydraulic pressure supply device according to claim 4, wherein
the auxiliary hydraulic pressure source is an electric oil pump driven by an electric motor, and oil discharged by a second pump rotor which is a pump rotor of the electric oil pump flows through the second discharge oil passage; and
the oil passage constitution member further includes
  a first surface contacted by an axial end surface of the first pump rotor, and
  a second surface which faces a direction opposite to the first surface and which is contacted by an axial end surface of the second pump rotor.

7. The vehicle hydraulic pressure supply device according to claim 6, wherein
the second surface is provided with a second discharge port which is dented inwardly of the oil passage constitution member and through which oil is discharged from the electric oil pump; and
the second discharge oil passage extends radially outward with reference to a rotational axis of the electric oil pump from the second discharge port to an opening in the second member joint portion.

8. The vehicle hydraulic pressure supply device according to claim 1, wherein
the oil passage constitution member further includes
  a suction oil passage through which oil suctioned by the first pump rotor flows,
  a return hole configured to return oil discharged by the first pump rotor to the suction oil passage, and
  a third member joint portion in which an opening of the return hole is formed;
the valve body includes a third body oil passage, and a third body joint portion in which an opening of the third body oil passage is formed; and
the third body oil passage is connected to the return hole with the third member joint portion and the third body joint portion joined to each other as located opposite to each other.

9. The vehicle hydraulic pressure supply device according to claim 4, wherein
the oil passage constitution member further includes
  a suction oil passage through which oil suctioned by the first pump rotor flows,
  a return hole configured to return oil discharged by the first pump rotor to the suction oil passage, and
  a third member joint portion in which an opening of the return hole is formed;
the valve body includes a third body oil passage, and a third body joint portion in which an opening of the third body oil passage is formed; and
the third body oil passage is connected to the return hole with the third member joint portion and the third body joint portion joined to each other as located opposite to each other.

10. The vehicle hydraulic pressure supply device according to claim 4, wherein
the oil passage constitution member further includes
  a suction oil passage through which oil suctioned by the first pump rotor flows,
  a return hole configured to return oil discharged by the first pump rotor to the suction oil passage, and
  a third member joint portion in which an opening of the return hole is formed;
the valve body includes a third body oil passage, and a third body joint portion in which an opening of the third body oil passage is formed;
the third body oil passage is connected to the return hole with the third member joint portion and the third body joint portion joined to each other as located opposite to each other;
the first member joint portion, the second member joint portion, and the third member joint portion are formed in the same surface or surfaces that are parallel to each other, and formed in a surface that is parallel to an extension direction of a rotational axis of the first pump rotor; and
the second member joint portion, the first member joint portion, and the third member joint portion are disposed in this order from one side in a circumferential direction with reference to the rotational axis of the first pump rotor.

11. The vehicle hydraulic pressure supply device according to claim 8, wherein
the return hole includes a discharge return oil passage that communicates with the first discharge oil passage and that returns oil in the first discharge oil passage to the suction oil passage;
the return hole accommodates a return oil passage control valve that controls a degree of opening of the discharge return oil passage;
the opening of the return hole is an opening through which a command hydraulic pressure for operation of the return oil passage control valve is supplied to the return oil passage control valve; and
the third body oil passage is an oil passage through which the command hydraulic pressure is supplied.

12. The vehicle hydraulic pressure supply device according to claim 8, wherein
the return hole is a body return oil passage through which oil in the third body oil passage is returned to the suction oil passage;
the opening of the return hole is an opening through which oil to be returned to the suction oil passage is supplied; and
the third body oil passage is an oil passage through which oil discharged from the hydraulic control valve flows.

13. The vehicle hydraulic pressure supply device according to claim 9, wherein
the return hole includes a discharge return oil passage that communicates with the first discharge oil passage and that returns oil in the first discharge oil passage to the suction oil passage;

the return hole accommodates a return oil passage control valve that controls a degree of opening of the discharge return oil passage;

the opening of the return hole is an opening through which a command hydraulic pressure for operation of the return oil passage control valve is supplied to the return oil passage control valve; and the third body oil passage is an oil passage through which the command hydraulic pressure is supplied.

14. The vehicle hydraulic pressure supply device according to claim 9, wherein the return hole is a body return oil passage through which oil in the third body oil passage is returned to the suction oil passage;

the opening of the return hole is an opening through which oil to be returned to the suction oil passage is supplied; and the third body oil passage is an oil passage through which oil discharged from the hydraulic control valve flows.

15. The vehicle hydraulic pressure supply device according to claim 10, wherein the return hole includes a discharge return oil passage that communicates with the first discharge oil passage and that returns oil in the first discharge oil passage to the suction oil passage;

the return hole accommodates a return oil passage control valve that controls a degree of opening of the discharge return oil passage;

the opening of the return hole is an opening through which a command hydraulic pressure for operation of the return oil passage control valve is supplied to the return oil passage control valve; and the third body oil passage is an oil passage through which the command hydraulic pressure is supplied.

16. The vehicle hydraulic pressure supply device according to claim 10, wherein the return hole is a body return oil passage through which oil in the third body oil passage is returned to the suction oil passage;

the opening of the return hole is an opening through which oil to be returned to the suction oil passage is supplied; and the third body oil passage is an oil passage through which oil discharged from the hydraulic control valve flows.

* * * * *